United States Patent
Baalke et al.

(10) Patent No.: US 10,338,591 B2
(45) Date of Patent: Jul. 2, 2019

(54) METHODS FOR AUTONOMOUSLY NAVIGATING ACROSS UNCONTROLLED AND CONTROLLED INTERSECTIONS

(71) Applicant: Amazon Technologies, Inc., Seattle, WA (US)

(72) Inventors: Uriah Baalke, San Francisco, CA (US); Stav Braun, San Francisco, CA (US); Sonia Jin, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/819,860

(22) Filed: Nov. 21, 2017

(65) Prior Publication Data

US 2018/0329418 A1    Nov. 15, 2018

Related U.S. Application Data

(60) Provisional application No. 62/425,328, filed on Nov. 22, 2016.

(51) Int. Cl.
*G05D 1/00* (2006.01)
*G05D 1/02* (2006.01)
(Continued)

(52) U.S. Cl.
CPC ....... *G05D 1/0088* (2013.01); *B60W 30/0956* (2013.01); *B60W 50/0097* (2013.01);
(Continued)

(58) Field of Classification Search
CPC .. G05D 1/0088; G05D 1/0214; G05D 1/0246; G05D 1/0276; B60W 30/0956; B60W 50/0097; B60W 2550/10
(Continued)

(56) References Cited

U.S. PATENT DOCUMENTS 6,504,530 B1   1/2003   Wilson et al.
7,339,993 B1   3/2008   Brooks et al.
(Continued)

FOREIGN PATENT DOCUMENTS

EP    2228779 A2    9/2010
WO    2015134376 A1    9/2015

OTHER PUBLICATIONS

International Search Report and Written Opinion for PCT Application No. PCT/US2017/062810 dated Jan. 29, 2018.

*Primary Examiner* — Tan Q Nguyen
(74) *Attorney, Agent, or Firm* — Athorus, PLLC

(57) ABSTRACT

One variation of a method for autonomously navigating along a crosswalk includes: at a first time, navigating autonomously along a sidewalk toward a crosswalk coinciding with a navigation route assigned to the autonomous vehicle; recording optical data of a scene proximal the autonomous vehicle via an optical sensor integrated into the autonomous vehicle; aligning an anteroposterior axis of the autonomous vehicle to the crosswalk detected in the optical data; identifying a pedestrian proximal the crosswalk in the optical data; in response to the pedestrian entering the crosswalk at a second time succeeding the first time, predicting right of way of the autonomous vehicle to enter the crosswalk; and, in response to predicting right of the autonomous vehicle to enter the crosswalk, autonomously navigating from the sidewalk into the crosswalk and autonomously navigating along the crosswalk to an opposing sidewalk according to the navigation route.

20 Claims, 3 Drawing Sheets

(51) Int. Cl.
  *B60W 30/095* (2012.01)
  *B60W 50/00* (2006.01)
  *G06F 19/00* (2018.01)
  *G06Q 50/28* (2012.01)
  *B60W 30/09* (2012.01)

(52) U.S. Cl.
  CPC ........... *G05D 1/024* (2013.01); *G05D 1/0214* (2013.01); *G05D 1/0244* (2013.01); *G05D 1/0246* (2013.01); *G05D 1/0276* (2013.01); *G06F 19/00* (2013.01); *G06Q 50/28* (2013.01); *B60W 2550/10* (2013.01); *G05D 2201/0216* (2013.01)

(58) Field of Classification Search
  USPC .......................................................... 701/27
  See application file for complete search history.

(56) References Cited

U.S. PATENT DOCUMENTS

| | | | |
|---|---|---|---|
| 8,532,862 | B2 | 9/2013 | Neff |
| 8,571,743 | B1 * | 10/2013 | Cullinane ................ G05D 1/00 701/23 |
| 8,688,306 | B1 | 4/2014 | Nemec et al. |
| 8,738,213 | B1 | 5/2014 | Szybalski et al. |
| 8,855,847 | B2 | 10/2014 | Uehara |
| 9,079,587 | B1 | 7/2015 | Rupp et al. |
| 9,120,484 | B1 * | 9/2015 | Ferguson ................ G06T 7/223 |
| 9,147,296 | B2 | 9/2015 | Ricci |
| 9,201,421 | B1 | 12/2015 | Fairfield et al. |
| 9,294,474 | B1 | 3/2016 | Alikhani |
| 9,381,916 | B1 | 7/2016 | Zhu et al. |
| 9,440,647 | B1 * | 9/2016 | Sucan ................... B60W 30/08 |
| 9,558,664 | B1 | 1/2017 | Gaebler et al. |
| 2003/0097047 | A1 | 5/2003 | Woltermann et al. |
| 2003/0162523 | A1 | 8/2003 | Kapolka et al. |
| 2006/0178140 | A1 | 8/2006 | Smith et al. |
| 2007/0005609 | A1 | 1/2007 | Breed |
| 2007/0244614 | A1 | 10/2007 | Nathanson |
| 2008/0161986 | A1 | 7/2008 | Breed |
| 2010/0157061 | A1 | 6/2010 | Katsman et al. |
| 2012/0083960 | A1 | 4/2012 | Zhu et al. |
| 2013/0231824 | A1 | 9/2013 | Wilson et al. |
| 2013/0238170 | A1 | 9/2013 | Klinger |
| 2013/0297099 | A1 | 11/2013 | Rovik |
| 2014/0081507 | A1 | 3/2014 | Urmson et al. |
| 2014/0136414 | A1 | 5/2014 | Abhyanker |
| 2014/0156133 | A1 | 6/2014 | Cullinane et al. |
| 2014/0172290 | A1 | 6/2014 | Prokhorov et al. |
| 2014/0188376 | A1 | 7/2014 | Gordon |
| 2014/0200737 | A1 | 7/2014 | Lortz et al. |
| 2014/0244678 | A1 | 8/2014 | Zamer et al. |
| 2014/0278052 | A1 | 9/2014 | Slavin et al. |
| 2015/0006005 | A1 | 1/2015 | Yu et al. |
| 2015/0153735 | A1 | 6/2015 | Clarke et al. |
| 2015/0193005 | A1 | 7/2015 | Censo et al. |
| 2015/0241878 | A1 | 8/2015 | Crombez et al. |
| 2015/0268665 | A1 | 9/2015 | Ludwick et al. |
| 2015/0291032 | A1 | 10/2015 | Kim et al. |
| 2015/0345966 | A1 | 12/2015 | Meuleau |
| 2015/0345971 | A1 | 12/2015 | Meuleau et al. |
| 2015/0346727 | A1 | 12/2015 | Ramanujam |
| 2015/0348112 | A1 | 12/2015 | Ramanujam |
| 2015/0348335 | A1 | 12/2015 | Ramanujam |
| 2015/0363986 | A1 | 12/2015 | Hoyos et al. |
| 2015/0367850 | A1 | 12/2015 | Clarke et al. |
| 2016/0025973 | A1 | 1/2016 | Guttag et al. |
| 2016/0068156 | A1 | 3/2016 | Horii |
| 2016/0085565 | A1 | 3/2016 | Arcese et al. |
| 2016/0093212 | A1 | 3/2016 | Barfield et al. |
| 2016/0144959 | A1 | 5/2016 | Meffert |
| 2016/0209220 | A1 | 7/2016 | Laetz |
| 2016/0209845 | A1 | 7/2016 | Kojo et al. |
| 2016/0216711 | A1 | 7/2016 | Srivastava et al. |
| 2016/0247404 | A1 | 8/2016 | Srivastava et al. |
| 2016/0288796 | A1 | 10/2016 | Yuan |
| 2016/0300400 | A1 | 10/2016 | Namikawa |
| 2016/0301698 | A1 | 10/2016 | Katara et al. |
| 2016/0307449 | A1 | 10/2016 | Gordon et al. |
| 2016/0370193 | A1 | 12/2016 | Maischberger et al. |
| 2017/0010613 | A1 | 1/2017 | Fukumoto |
| 2017/0301232 | A1 * | 10/2017 | Xu ........................ G06T 17/05 |
| 2018/0134286 | A1 * | 5/2018 | Yi ......................... B60W 10/04 |
| 2018/0307223 | A1 | 10/2018 | Peeters et al. |

* cited by examiner

METHODS FOR AUTONOMOUSLY NAVIGATING ACROSS UNCONTROLLED AND CONTROLLED INTERSECTIONS

CROSS-REFERENCE TO RELATED APPLICATIONS

This application claims priority to U.S. patent application No. 62/425,328, filed Nov. 22, 2016, the contents of which are incorporated by reference herein in their entirety.

TECHNICAL FIELD

This invention relates generally to the field of autonomous vehicles and more specifically to new and unique methods for autonomously navigating across uncontrolled and controlled intersections in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods

Figure 1:
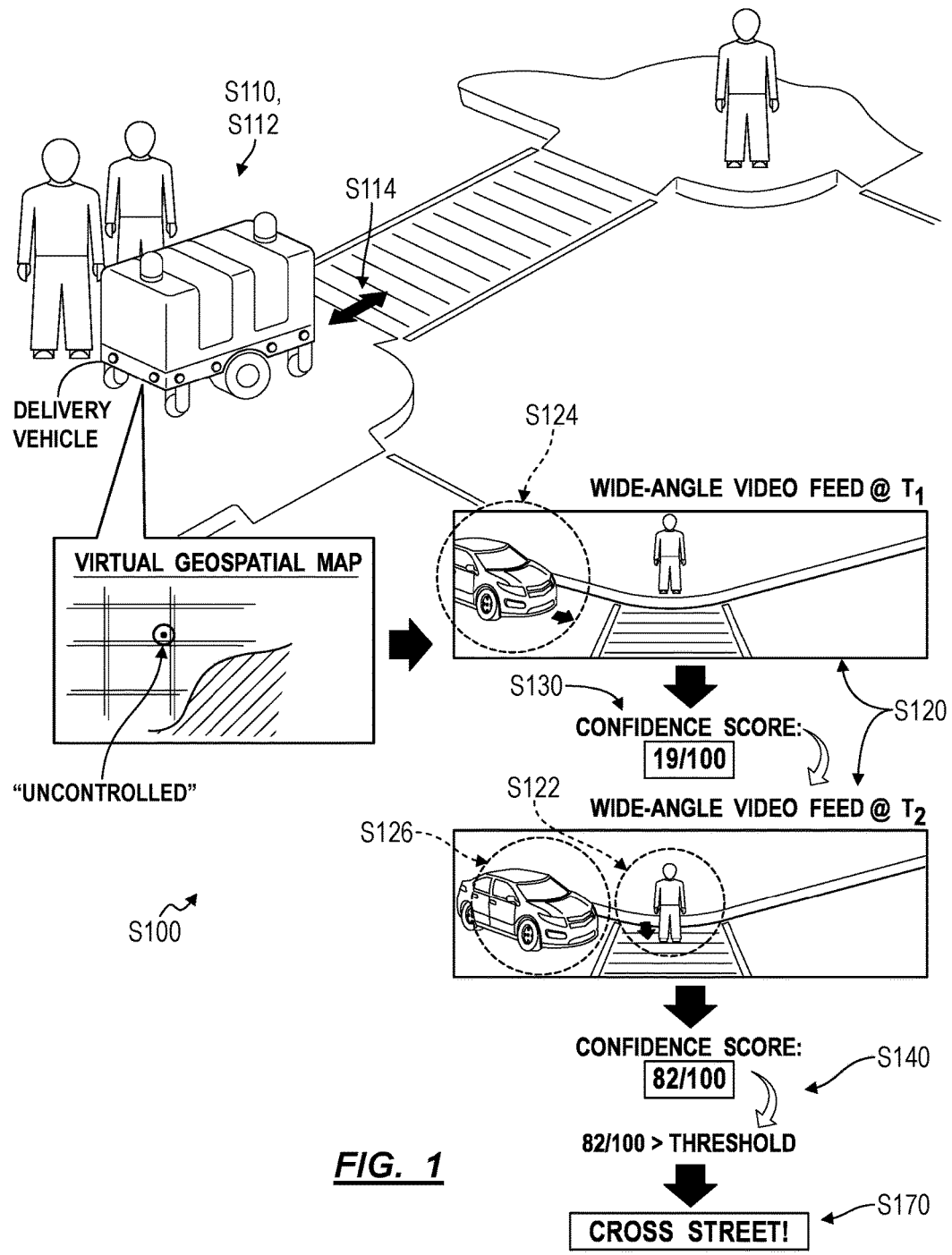
FIG. 1 is a flowchart representation of a method.

As shown in FIG. 1, a method S100 for autonomously navigating along a crosswalk includes, at an autonomous vehicle: at a first time, navigating autonomously along a sidewalk toward a crosswalk at an intersection in Block S110, the crosswalk coinciding with a navigation route assigned to the autonomous vehicle; recording optical data of a scene proximal the autonomous vehicle via an optical sensor integrated into the autonomous vehicle in Block S120; aligning an anteroposterior axis of the autonomous vehicle to the crosswalk detected in the optical data in Block S112; identifying a pedestrian proximal the intersection in the optical data in Block S122; in response to the pedestrian entering the crosswalk at a second time succeeding the first time, predicting right of way of the autonomous vehicle to enter the intersection in Block S140; and, in response to predicting the right of the autonomous vehicle to enter the intersection, autonomously navigating from the sidewalk into the crosswalk and autonomously navigating along the crosswalk to an opposing sidewalk according to the navigation route in Block S170.

Figure 2:
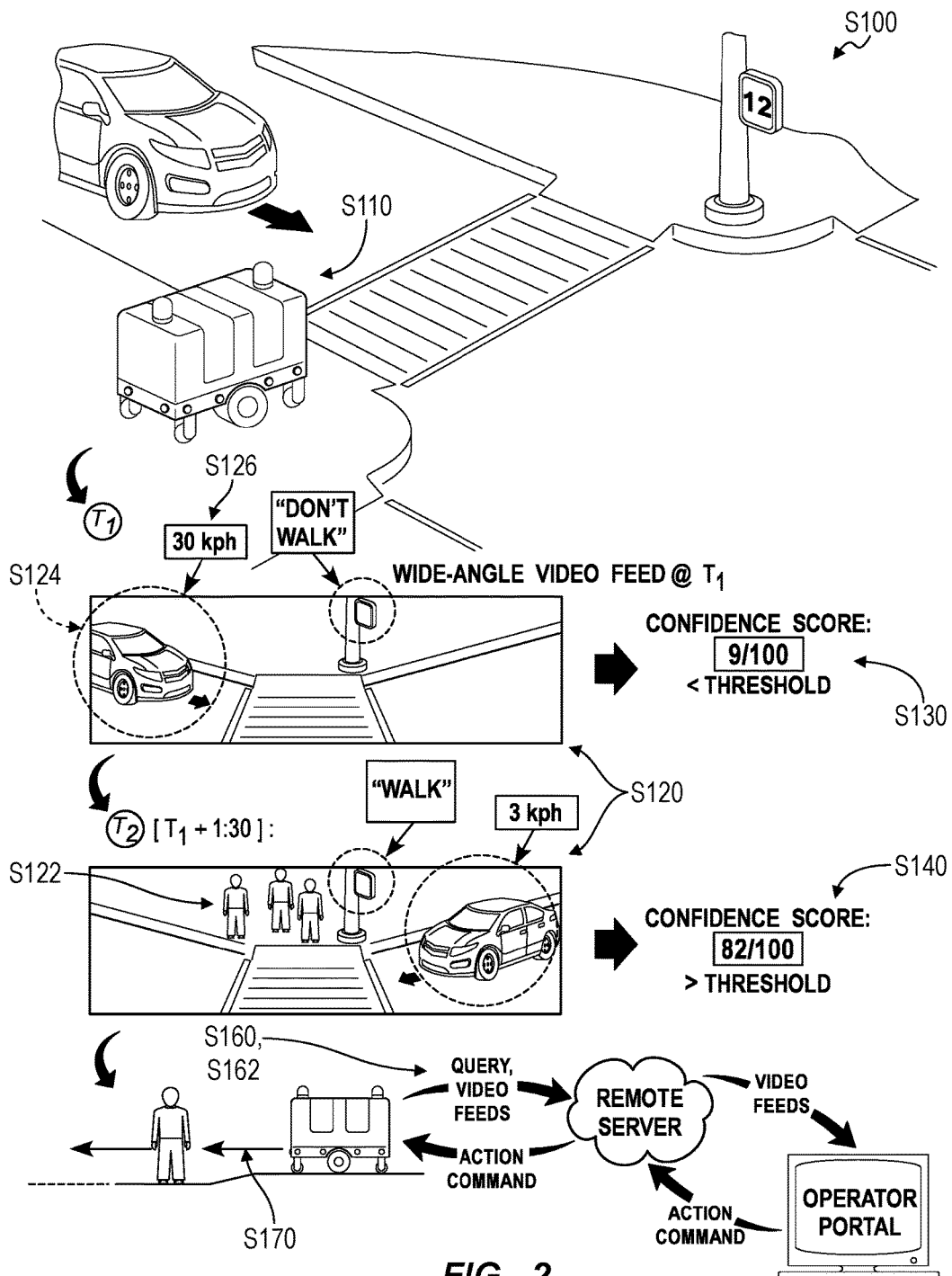
FIG. 2 is a flowchart representation of one variation of the method.

As shown in FIG. 2, one variation of the method S100 includes, at an autonomous vehicle: navigating autonomously along a sidewalk toward a crosswalk at an intersection in Block S110, the crosswalk coinciding with a navigation route assigned to the autonomous vehicle; recording optical data of a scene proximal the autonomous vehicle via an optical sensor integrated into the autonomous vehicle in Block S120; aligning an anteroposterior axis of the autonomous vehicle to the crosswalk detected in the optical data in Block S112; at a first time, calculating a first confidence score for right of way of the autonomous vehicle to enter the crosswalk based on proximity of a vehicle detected proximal the intersection in the scan data in Block S130; at a second time succeeding the first time, identifying a pedestrian proximal the intersection in the optical data in Block S122; in response to the pedestrian entering the crosswalk, calculating a second confidence score for right of way of the autonomous vehicle to enter the crosswalk based on presence of the pedestrian in the crosswalk in Block S140, the second confidence score greater than the first confidence score; in response to the second confidence score exceeding a first threshold score, transmitting a query to a remote operator portal to confirm entry of the autonomous vehicle into the crosswalk in Block S160; and, in response to confirmation to enter the crosswalk from the remote operator portal, autonomously navigating from the sidewalk into the crosswalk and autonomously navigating along the crosswalk to an opposing sidewalk according to the navigation route in Block S170.

Figure 3:
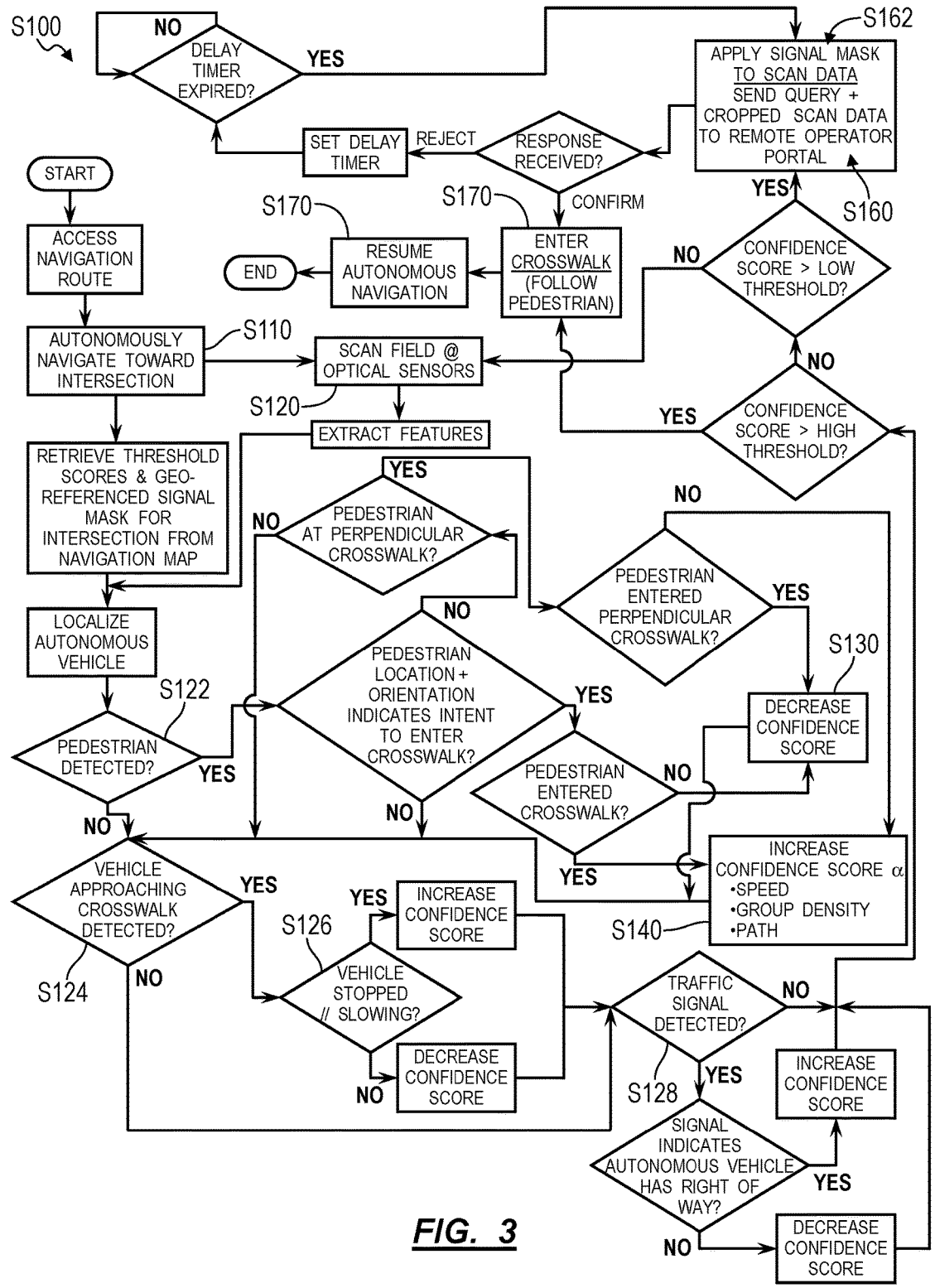
FIG. 3 is a flowchart representation of one variation of the method.

As shown in FIG. 3, another variation of the method S100 includes, at an autonomous vehicle: navigating autonomously along a sidewalk toward a crosswalk at an intersection in Block S110, the crosswalk coinciding with a navigation route assigned to the autonomous vehicle; recording optical data of a scene proximal the autonomous vehicle via an optical sensor integrated into the autonomous vehicle; aligning an anteroposterior axis of the autonomous vehicle to the crosswalk detected in the optical data in Block S112; at a first time, detecting states of lighted traffic signals, proximal the intersection, in the optical data; at approximately the first time, calculating a velocity of a vehicle approaching the intersection in Block S126; calculating a confidence score for right of way of the autonomous vehicle to enter the intersection based states of lighted traffic signals proximal the intersection and the velocity of the vehicle in Block S130; in response to the confidence score exceeding a threshold score, transmitting a query to a remote operator portal to confirm entry of the autonomous vehicle into the crosswalk in Block S160; and, in response to confirmation to enter the crosswalk from the remote operator portal, autonomously navigating from the sidewalk into the crosswalk and autonomously navigating along the crosswalk to an opposing sidewalk according to the navigation route in Block S170.

2. Applications

Generally, an autonomous vehicle can execute Blocks of the method S100 and variations of the method S100 locally in order to determine when and how to navigate across an intersection, such as uncontrolled, yield-controlled, stop-controlled, and signal-controlled intersections. In particular, an autonomous vehicle configured to autonomously navigate along a sidewalk or bike lane can execute Blocks of the method S100 to locally determine instances in which the autonomous vehicle may cross a street or intersection—such as at a crosswalk—with limited risk of collision with a pedestrian, cyclist, or road vehicle (e.g., a car or truck). The autonomous vehicle can: fuse data from various sensors integrated into the autonomous vehicle into a confidence score (hereinafter a "crossing confidence score") that the autonomous vehicle has right of way to enter the intersection; and then navigate across the intersection—such as by autonomously navigating within the crosswalk—when this confidence score exceeds a threshold score. However, in response to various triggers—such as a crossing confidence score that remains below a threshold score for at least a threshold period of time—the autonomous vehicle can query a remote operator portal to manually indicate whether the autonomous vehicle has right of way to enter the intersection and offload sensor data to the remote operator portal sufficient to enable a remote human operator to provide an accurate response to the autonomous vehicle's query.

In particular, the autonomous vehicle can be configured to: autonomously navigate to a pickup location where its hull is automatically or manually loaded with a package; to autonomously navigate along sidewalks or other pedestrian traffic lanes according to a navigation route extending from the pickup location to a designated drop-off location for the package; and then to release the package to its designated recipient. When navigating between pickup and drop-off locations, the autonomous vehicle can locally execute Blocks of the method S100 to: navigate toward an intersection coinciding with its assigned navigation route; collect sensor data (e.g., optical distance and/or color information) of a field around the autonomous vehicle; determine its position and orientation near the intersection based on a localization map and immutable features detected in these sensor data (e.g., edges of sidewalks, road signs, building facades, etc.); and to determine whether the autonomous vehicle has right of way to enter the intersection (i.e., enter onto and navigate along the crosswalk coinciding with its navigation route) based on mutable features detected in these sensor data (e.g., states of controlled traffic signs, states of other vehicles nearby, states of pedestrians nearby, etc.) The autonomous vehicle can then selectively enter the crosswalk autonomously, hold at a sidewalk facing the crosswalk, or query a remote human operator to assist the autonomous vehicle's next decision based on the autonomous vehicle's determination of whether it has right of way and/or its confidence in its possession of right of way to enter the intersection.

The autonomous vehicle can execute variations of the method S100 based on the type of intersection occupied by the autonomous vehicle. For example, when occupying an uncontrolled, yield-controlled, or stop-controlled intersection, the autonomous vehicle can: implement computer vision techniques to track the speed of a road vehicle approaching the intersection; regularly (re)calculate a crossing confidence score based on a rate of deceleration of the road vehicle approaching the intersection; and cross the intersection when the crossing confidence score exceeds a threshold score. In this example, the autonomous vehicle can also: identify and track pedestrians at the intersection; such as at the same or opposite corner of the intersection as the autonomous vehicle; increase the crossing confidence score in response to a pedestrian crossing the street; and then cross the street with (e.g., adjacent or following) the pedestrian if the crossing confidence score exceeds the threshold score. In another example, when occupying a signal-controlled intersection, the autonomous vehicle can: implement computer vision techniques to track a lighted signal at the intersection; determine a right of way of vehicles and pedestrians at the intersection; regularly (re)calculate a crossing confidence score for the intersection based on the current right of way and motion of road vehicles and pedestrians into and out of the intersection; and then cross the street if the crossing confidence score exceeds the threshold score.

Blocks of the method S100 are described herein as executed locally by a last-mile autonomous vehicle configured to navigate along pedestrian pathways and to deliver packages or other goods to designated recipients. However, Blocks of the method S100 can alternatively be executed remotely by any other type of autonomous vehicle and/or by a remote server based on data received from such an autonomous vehicle.

2. Example Implementations

According to the method S100, when autonomously navigating toward an uncontrolled, yield-controlled, or stop-controlled intersection coinciding with its assigned navigation route, the autonomous vehicle can: record optical data through a suite of color cameras and/or distance sensors (e.g., LIDAR scanners) arranged on the autonomous vehicle; implement computer vision techniques to detect immutable objects (e.g., road surfaces, sidewalk surfaces, building facades, traffic signs, traffic lights, crosswalk and road lane markers, etc.) and mutable objects (e.g., pedestrians, vehicles, traffic light states, etc.) in a scene around the vehicle; and determine its location and orientation in real space based on positions of these immutable objects relative to the autonomous vehicle and indicated positions of like objects in a localization map stored on the autonomous vehicle, as shown in FIG. 3. Based on its location in real space and its assigned navigation route, the autonomous vehicle can plan its next action, such as navigating through the intersection via a crosswalk or turning onto another sidewalk as the autonomous vehicle reaches the intersection. If the navigation route coincides with a crosswalk at this intersection, the autonomous vehicle can then calculate a confidence score for the autonomous vehicle's right of way to enter the crosswalk and cross the intersection to an opposing sidewalk based on various mutable features detected in the scene nearby.

3.1 Unprotected Crosswalk

In one example implementation, upon approaching a crosswalk labeled as unprotected in the navigation map or upon otherwise determining that the upcoming crosswalk is unprotected (e.g., based on lack of controlled signals detected near the crosswalk), the autonomous vehicle can default to scanning the scene nearby for road vehicles approaching the crosswalk and calculate a confidence score for entering the crosswalk based on (e.g., as an inverse function of) presence of vehicles and speed of these road vehicles. However, the autonomous vehicle may derive more useful information regarding its right of way to enter the crosswalk (e.g., its risk of colliding with another vehicle upon entering the crosswalk) based on actions of a pedestrian at the intersection. For example, if another pedestrian is present at the intersection, such as on the same or opposing sidewalk as the autonomous vehicle, the autonomous vehicle can: detect the pedestrian; predict the pedestrian's intent to cross the same crosswalk (or adjacent parallel crosswalk) as the autonomous vehicle based on the pedestrian's actions or orientation relative to the crosswalk; calculate a lower confidence score for right of way to enter the crosswalk while the pedestrian remains on the sidewalk; and then calculate an increased confidence score for right of way to enter the crosswalk once the pedestrian enters the sidewalk, as shown in FIG. 3. In particular, the autonomous vehicle can: predict that the pedestrian is likely crossing the intersection safely and is moving through the crosswalk at a typical pedestrian walking speed; predict that the pedestrian is entering the intersection dangerously if running across the crosswalk; and predict that the pedestrian is paying poor attention to the intersection if moving through the crosswalk at significantly below the typical pedestrian walking speed; and adjust the calculated confidence score for its right of way to enter the crosswalk accordingly.

Furthermore, if the autonomous vehicle detects a group of pedestrians waiting on the same or opposing sidewalk, the autonomous vehicle can monitor this group and adjust the confidence score for entering the unprotected crosswalk based on actions of the group. In particular, the autonomous vehicle can: calculate a high confidence score for its right of way to enter the same crosswalk upon detecting the group of pedestrians transitioning—approximately in unison—from standing on the sidewalk to entering the crosswalk; and maintain a high confidence score for its right of way to enter the crosswalk with the pedestrians if the density or speed of the group of pedestrians moving through the crosswalk remains consistent and/or approximates an expected pedestrian walking speed. However, upon detecting only a (relatively small) portion of pedestrians in this group transitioning onto the crosswalk and/or large disparity in the speed at which the pedestrians move through the crosswalk, the autonomous vehicle can calculate a reduced confidence score for its right of way to enter this crosswalk.

In particular, the pedestrian may be particularly capable of determining whether the crosswalk is safe for her to enter, and vehicles approaching the crosswalk may be more likely to stop for the pedestrian than for the autonomous vehicle; the pedestrian's entry onto the crosswalk may be a strong indicator of the autonomous vehicle's risk when entering the crosswalk. The autonomous vehicle can therefore implement Blocks of the method S100 to adjust its confidence score for entering an unprotected crosswalk based on presence and actions of pedestrians near this crosswalk, such as in addition to or instead of proximity and speed of other road vehicles approaching the unprotected crosswalk.

3.2 Unprotected Crosswalk

In another example implementation, upon approaching a crosswalk labeled as protected in the navigation map or upon otherwise determining that the upcoming crosswalk is protected, the autonomous vehicle can default to scanning the scene nearby for a controlled traffic signal and/or a controlled pedestrian signal and extract right of way of the autonomous vehicle to enter the intersection from the state of this signal. The autonomous vehicle can confirm its right of way (e.g., increase the confidence score for its right of way) based on proximity and speed of the road vehicle approaching the intersection or approaching the crosswalk, as shown in FIG. 3.

However, in certain scenarios, controlled traffic signals, controlled pedestrian signals, and/or road vehicles at or approaching the intersection may be obscured from optical sensors in the autonomous vehicle, such as by: glare from the Sun; weather (e.g., fog, rain); pedestrians standing near the autonomous vehicle; large vehicles (e.g., trucks, trailers) near the intersection; nearby road construction; etc. The autonomous vehicle can therefore scan the scene nearby for other indicators of the autonomous vehicle's right of way to enter the intersection. For example, the autonomous vehicle can: implement computer vision techniques to detect a pedestrian facing the same crosswalk, such as just in front of or beside the autonomous vehicle; and calculate a confidence score for the autonomous vehicle's right of way to enter the adjacent crosswalk based on whether the pedestrian has entered the crosswalk, the pedestrian's speed through the crosswalk, actions of other pedestrians nearby, etc. As other data indicative of the autonomous vehicle's right of way—such as visibility of other vehicles near the intersection or a pedestrian signal at the opposite side of the crosswalk—come into the autonomous vehicle's field of view over time, the autonomous vehicle can regularly update this confidence score accordingly, as shown in FIG. 3.

As in the foregoing example implementation, pedestrians near a controlled intersection may: exhibit a strong contextual understanding of the intersection and their risk of entering the crosswalk; and directly influence drivers of vehicles approaching the crosswalk (i.e., inherently cause these drivers to slow to avoid colliding with these pedestrians). The autonomous vehicle can therefore track pedestrians near the intersection and calculate a confidence score for entering the intersection based on actions of these pedestrians, such as selectively when other traffic-related data is unavailable to the autonomous vehicle or in combination with traffic-related data of other types.

3.3 Navigation

Once the autonomous vehicle calculates a confidence score—for its possession of right of way to enter the intersection—that exceeds a preset threshold score (e.g., 90/100), the autonomous vehicle can automatically: navigate from the sidewalk into the crosswalk via a nearby ramp; navigate along the crosswalk (e.g., between lane markers on each side of the crosswalk); navigate up a far ramp onto the opposing sidewalk; and resume autonomous execution of its assigned navigation path, as shown in FIG. 3. In the example implementations described above in which the autonomous vehicle detects a pedestrian on the same side of the crosswalk and calculates an increased confidence score that exceeds this preset threshold score responsive to the pedestrian entering the crosswalk just ahead of the autonomous vehicle, the autonomous vehicle can also: autonomously follow within a threshold distance of the pedestrian as the pedestrian moves through the crosswalk, as shown in FIG. 2; and then veer from behind the pedestrian to the far ramp between the crosswalk and the opposing sidewalk as the autonomous vehicle nears the opposing sidewalk. The autonomous vehicle can therefore automatically resume its navigation route by following the pedestrian along the crosswalk once the pedestrian enters the intersection.

As shown in FIG. 3, the autonomous vehicle can also implement multiple threshold scores. For example, if the autonomous vehicle calculates a confidence score that exceeds a high preset threshold score (e.g., 95/100), the autonomous vehicle can automatically enter the crosswalk and resume autonomous execution of its assigned navigation route. However, if the autonomous vehicle calculates a confidence score between a low preset threshold score (e.g., 85/100) and the high preset threshold score, the autonomous vehicle can: transmit a query to a remote operator portal (e.g., via a remote server) for manual confirmation to enter the intersection; transmit sensor data to the remote operator portal to assist a remote human operator in responding to the autonomous vehicle's query; hold at the sidewalk adjacent the crosswalk while awaiting a response from the remote human operator; and then enter the intersection autonomously or under control by the remote human operator responsive to confirmation from the remote human operator. Otherwise, the autonomous vehicle can hold at the sidewalk adjacent the crosswalk until it calculates a confidence score—for its right of way to enter the intersection—that exceeds one of both of these threshold scores. Therefore, rather than query the remote operator portal for assistance when the autonomous vehicle is unable to reach a confident decision regarding its next action, the autonomous vehicle can instead execute Blocks of the method S100 to define a next action (e.g., entering a crosswalk), calculate a confidence that this next action may be executed at sufficiently low risk to the autonomous vehicle (and pedestrians, etc. nearby), and selectively query a remote human operator to confirm this next action. In particular, the autonomous vehicle can execute Blocks of the method S100 to query a remote human operator for assistance only when the autonomous vehicle is sufficiently confident that entering the crosswalk is a proper next action, thereby limiting total time that the remote human operator must dedicate to assisting the autonomous vehicle through the intersection, reducing total volume of data transmitted from the autonomous vehicle to the remote operator portal, and thus reducing per-mile operating cost of the autonomous vehicle.

Furthermore, in the foregoing implementation, when the autonomous vehicle is very highly confident that it possesses right of way to enter the intersection—such as when a large group of pedestrians in front of the autonomous vehicle step into a crosswalk in unison—the autonomous vehicle can automatically resume autonomous navigation without assistance from the remote human operator, thereby consuming human operator time and sensor data transmission resources as a function of the autonomous vehicle's perceived need for human assistance (i.e., inversely proportional to the autonomous vehicle's confidence score for right of way to enter the crosswalk when this confidence score exceeds a minimum threshold score).

The autonomous vehicle can additionally or alternatively query the remote operator portal for manual assistance in other select scenarios, such as when the autonomous vehicle has remained at a sidewalk facing a crosswalk for more than a threshold duration of time (e.g., 90 seconds) without reaching a confidence score exceeding a minimum threshold score, as shown in FIG. 3, thereby preventing the autonomous vehicle from getting "stuck" at the same intersection for too long. (Similarly, the autonomous vehicle can reduce the minimum threshold score as a function of the duration of time that the autonomous vehicle has occupied the same side of the sidewalk and then query the remote operator portal for manual assistance when the confidence score calculated by the autonomous vehicle exceeds this dynamic minimum threshold score).

The autonomous vehicle can therefore execute Blocks of the method S100: to transform positions and actions of pedestrians near an intersection (and other features detected in the scene) into a confidence score for the autonomous vehicle's right of way to enter the intersection; and to selectively query a remote human operator for assistance when the confidence score indicates that assistance from the remote human operator may be particularly relevant, thereby yielding efficient use of data transfer and remote human operator bandwidth, rapid decision-making, and low increase in risk to the autonomous vehicle.

4. Autonomous Vehicle

The autonomous vehicle functions to autonomously traverse a pedestrian walkway, bike lane, or other pedestrian pathway. For example, the delivery vehicle can be deployed in an urban environment to complete last-mile delivery of a package or bag of groceries to an end-recipient.

As shown in FIG. 1, the delivery vehicle can include: a chassis; a drive system (e.g., including two driven center wheels, and one or two 360°-swivel castors at each end); a cargo hold configured to hold one or more discrete payloads (e.g., multiple individually-packaged goods, multiple grocery bags containing multiple grocery items, or boxes containing one or more items) in a heated, cooled, or unconditioned volume; a set of sensors configured to collect information about the delivery vehicle's environment; and a controller configured to transform sensor streams output by the set of sensors into a crossing confidence score and to navigate the delivery vehicle over a pedestrian walkway or bike lane based on crossing confidence scores calculated over time.

In one implementation, the delivery vehicle includes one or more 360° LIDAR sensors arranged on the top of the delivery vehicle, such as at each of the front and rear of the delivery vehicle. Each LIDAR sensor can output one three-dimensional distance map—such as in the form of a 3D point cloud representing distances between one meter and 50 meters between the LIDAR sensor and an external surface within the field of view of the LIDAR sensor—per rotation of the LIDAR sensor (i.e., once per scan cycle). The delivery vehicle can also include one or more color cameras facing outwardly from the front, rear, and left lateral and right lateral sides of the delivery vehicle. For example, each camera can output a video feed containing a sequence of digital photographic images (or "frames"), such as at a rate of 20 Hz. Furthermore, the delivery vehicle can include a set of infrared proximity sensors arranged along the perimeter of the base of the delivery vehicle and configured to output signals corresponding to proximity of objects and pedestrians within one meter of the delivery vehicle. The controller within the delivery vehicle can thus fuse data streams from the LIDAR sensor(s), the color camera(s), and the proximity sensor(s) into one real-time 3D color map of surfaces (e.g., surfaces of roads, sidewalks, road vehicles, pedestrians, etc.) around the delivery vehicle per scan cycle and then process each 3D color map into a crossing confidence score or other navigational decision while traversing a pedestrian sidewalk, crosswalk, or bike lane, etc.

4. Navigation Route

Prior to or during navigation, the autonomous vehicle can access or calculate a navigation route from its current location to a destination location, as shown in FIG. 3, such as where the autonomous vehicle will be loaded with a package for delivery to a recipient or where the autonomous vehicle will handoff a package to its recipient.

For example, the autonomous vehicle can access a navigation map containing a geospatial representation of a geographic region populated with labels indicating sidewalks, crosswalks, sidewalk ramps, building entry and exit points, curb cuts for road vehicles, building addresses, sidewalk dimensions, locations of sidewalk obstructions (e.g., trashcans, telephone poles, etc.), etc. Upon receipt of an order specifying a pickup or delivery address, such as from a remote computer system (e.g., a logistics server), the autonomous vehicle can reference the navigation map to calculate a navigation path from its current location, along a sequence of sidewalks, to the specified address. The autonomous vehicle can also assign nominal speeds to segments of the navigation path, such as based on preset speeds stored in the navigation map or proportional to widths and typical pedestrian traffic along these sidewalk segments.

Similarly, the autonomous vehicle can inject a flag to query a remote human operator for assistance at each intersection along the navigation route or at select intersections noted as higher risk or otherwise requiring manual assistance in the navigation map.

Alternatively, the remote computer system can: calculate this navigation route; populate this navigation route with nominal speeds, remote assistance flags, etc. remotely; and can upload these data to the autonomous vehicle for execution. However, the autonomous vehicle can generate or receive a navigation path and related data in any other way.

5. Autonomous Navigation

Block S110 of the method S100 recites navigating autonomously along a sidewalk toward a crosswalk at an intersection, wherein the crosswalk coincides with a navigation route assigned to the autonomous vehicle; and Block S120 of the method S100 recites recording optical data of a scene proximal the autonomous vehicle via an optical sensor integrated into the autonomous vehicle. Generally, in Blocks S110 and S120, the autonomous vehicle can scan its nearby field for static and dynamic objects—such as curbs, buildings, road vehicles, trashcans, telephone and traffic signal poles, and pedestrians, etc.—and implement autonomous navigation techniques to traverse sidewalks or other pedestrian lanes according to the navigation route based on the autonomous vehicle's location and orientation in real space and based on mutable and immutable objects detected in the field around the autonomous vehicle, as shown in FIGS. 1, 2, and 3.

5.1 Object Detection

As described above, the autonomous vehicle can include a set of LIDAR sensors and a set of color cameras (and/or a set of color distance sensors, etc.) and can regularly scan these sensors, such as at a rate of 10 Hz. For each scan (or sequence of scans), the autonomous vehicle can implement computer vision techniques to detect and identify such obstacles near the autonomous vehicle, such as within a field spanning ten meters ahead, three meters to the side, and five meters behind the autonomous vehicle or within a field spanning a volume proportional to the speed of the autonomous vehicle.

For example, the autonomous vehicle can: detect and extract features from depth and color images of the field; implement object detection techniques to associate groups of features with discrete objects in the field; and then classify each object as one of a curb, building, road vehicle, trashcan, telephone pole, or pedestrian, etc. based on features that define the object and known characteristics (e.g., models) of such objects. In Block S122 described below, the autonomous vehicle can also implement face detection techniques to detect faces of pedestrians facing the autonomous vehicle and to estimate the gaze of these pedestrians, and the autonomous vehicle can implement human tracking techniques to detect bodies of pedestrians not facing the autonomous vehicle but within the field around the autonomous vehicle.

5.2 Intersection Approach and Crosswalk Detection

As the autonomous vehicle approaches an intersection coinciding with the navigation route, the autonomous vehicle can prepare to enter a crosswalk at this intersection while collecting various data pertinent to deriving the autonomous vehicle's right of way to enter the crosswalk.

In one implementation, to prepare to cross a street at an intersection for which limited historical street crossing data is available, the autonomous vehicle can: reference current sensor data to a localization map to confirm the autonomous vehicle's position and orientation relative to the intersection; identify a crosswalk to enter, such as by identifying crosswalk lane markers within scan data collected by the autonomous vehicle while approaching or occupying an adjacent sidewalk; align its anteroposterior axis with the long axis of the crosswalk (e.g., perpendicular vehicle traffic along the road) in Block S112; and then define a sequence of waypoints along the crosswalk, such as a first waypoint coinciding with a detected ramp from the sidewalk currently occupied by the autonomous vehicle onto a near end of the crosswalk and a second waypoint coinciding with a ramp from the far end crosswalk onto the opposing sidewalk. For example, the autonomous vehicle can implement computer vision techniques (e.g., template matching, pattern matching, edge detection, etc.) to identify sidewalk ramps—at near and far ends of the crosswalk—in scan data collected by the autonomous vehicle when approaching the intersection and/or occupying a position on the near sidewalk. The autonomous vehicle can then define one waypoint centered on each ramp and a line of waypoints along the crosswalk.

Alternatively, these georeferenced waypoints along the crosswalk can be predefined in the navigation map, and the navigation route assigned to the autonomous vehicle can be preloaded with these georeferenced waypoints.

The autonomous vehicle can then implement Blocks of the method S100 described below to calculate a confidence score for the autonomous vehicle's right of way to enter the crosswalk based on states of objects (e.g., traffic signals, road vehicles, pedestrians, etc.) nearby.

6. Intersection Type

In one variation, the autonomous vehicle identifies a type of the intersection or crosswalk and weights various features in the scene around the intersection for calculating the crossing confidence score based on a type of the intersection or crosswalk. For example, as the autonomous vehicle prepares to enter a crosswalk, the autonomous vehicle can: identify the crosswalk as an unprotected crosswalk based on an unprotected crosswalk label associated with the intersection in the navigation map; deactivate traffic signal detection; and instead assign a high weight to pedestrian actions at the intersection and a moderate weight to actions of vehicles approaching the intersection when calculating the crossing confidence score for the crosswalk.

In another example, the autonomous vehicle can identify the crosswalk as a protected crosswalk by a lighted traffic signal based on a protected crosswalk label associated with the intersection in the navigation map. Accordingly, the autonomous vehicle can assign a high weight to the status of a traffic signal at a geospatial location predefined in the navigation map, a moderate weight to pedestrian actions at the intersection, and a low weight to actions of vehicles approaching the intersection when calculating the crossing confidence score for the crosswalk.

However, the autonomous vehicle can implement any other method or technique to identify a type of the intersection, to prioritize various features detected in the scene nearby, and to access georeferenced locations of expected locations of such features in the field of view of the autonomous vehicle, etc.

7. Unprotected Crosswalk

In one variation shown in FIG. 1, the autonomous vehicle approaches an unprotected intersection, detects various mutable and immutable features near the intersection, and determines the autonomous vehicle's right of way to enter the intersection based on these features.

For example, the autonomous vehicle can identify the crosswalk as an unprotected crosswalk based on an unprotected crosswalk label associated with the intersection in a navigation map, as described above. The autonomous vehicle can then: implement computer vision techniques, such as described below, to identify a pedestrian occupying the sidewalk proximal the crosswalk (e.g., adjacent the autonomous vehicle) in optical data recorded by the autonomous vehicle over a first period of time in Block S122; and calculate a first confidence score—less than a first threshold score—for right of way of the autonomous vehicle to enter the intersection responsive to detecting the pedestrian stopped on the sidewalk adjacent the crosswalk in Block S130. Because the first threshold score exceeds the first confidence score, the autonomous vehicle can halt on the sidewalk proximal the crosswalk, continue to scan its field for features indicating right of way at the intersection, and recalculate the confidence score accordingly.

Subsequently, the autonomous vehicle can calculate a second confidence score—exceeding the first confidence score—for right of way of the autonomous vehicle to enter the intersection in Block S140 responsive to detecting the pedestrian entering the crosswalk at a second, later time. The autonomous vehicle can then autonomously navigate from the sidewalk into the crosswalk automatically in Block S170 in response to the second confidence score exceeding the first threshold score. Alternatively, the autonomous vehicle can query the remote operator portal for confirmation to enter the intersection in Block S160 in response to the second confidence score exceeding the first threshold score and only resume navigation through the intersection in Block S170 following confirmation from the remote human operator, as described below.

7.1 Pedestrian Detection and Tracking

In one implementation, the autonomous vehicle calculates a crossing confidence score as a function of the location and action of a pedestrian detected—in scan data collected by the autonomous vehicle—near the intersection, as shown in FIGS. 1, 2, and 3.

In one implementation, the autonomous vehicle scans the scene proximal the autonomous vehicle for pedestrians, such as by implementing computer vision techniques to detect human faces and/or human bodies or silhouettes in the optical data representing the field around the autonomous vehicle. Upon detecting a particular pedestrian occupying the sidewalk proximal the crosswalk in optical data recorded over a period of time, the autonomous vehicle can associate this pedestrian with the crosswalk if certain conditions are met. For example, the autonomous vehicle can: calculate an angular yaw offset between the anteroposterior axis of the pedestrian's body (or face) and the crosswalk; and characterize an intent of the pedestrian to enter the crosswalk as a function of (e.g., proportional to) a duration of time that the pedestrian occupies the sidewalk near the crosswalk, as an inverse function of (e.g., inversely proportional to) the angular yaw offset between the pedestrian and the crosswalk, and as an inverse function of a distance between the pedestrian's location and a near edge of the crosswalk over this period of time. The autonomous vehicle can thus: predict that the pedestrian intends to cross this street at this crosswalk at some time in the future if this derived intent of the pedestrian exceeds a threshold intent; and link an action of the pedestrian with a confidence in the pedestrian's—and therefore the autonomous vehicle's—right of way to enter the intersection.

In particular, if the derived intent of the pedestrian to enter the crosswalk exceeds a threshold intent, the autonomous vehicle can associate right of way of the autonomous vehicle to enter the intersection with entry of the pedestrian into the crosswalk. Therefore, the autonomous vehicle can calculate a low crossing confidence score for the autonomous vehicle in Block S130 while the pedestrian is detected—in scan data—on the sidewalk near the crosswalk and then increase this crossing confidence score in Block S140 upon detecting—in subsequent scan data—that the pedestrian has stepped onto the crosswalk.

The autonomous vehicle can continue to track the pedestrian in scan data collected during subsequent scan cycles and adjust the crossing confidence score accordingly. For example, the pedestrian moving quickly (e.g., jogging, running) through the crosswalk may indicate that the pedestrian does not have right of way, and the pedestrian moving slowly through the crosswalk may indicate that the pedestrian is paying insufficient attention to the intersection. Therefore, in this example, the autonomous vehicle can: store or access a nominal pedestrian walking speed; extract a speed of the pedestrian entering and moving through the crosswalk; calculate a difference between the pedestrian's speed and the nominal pedestrian walking speed; and then decrease the crossing confidence score for the autonomous vehicle proportional to this difference. Therefore, the autonomous vehicle can calculate a confidence score for right of way of the autonomous vehicle to enter the intersection in Block S140 as a function of the pedestrian entering the crosswalk and heading toward the autonomous vehicle and as an inverse function of a difference between a speed of the pedestrian and a predefined nominal pedestrian speed. In another example, the autonomous vehicle can track the pedestrian's path through the crosswalk and decrease the crossing confidence score for the autonomous vehicle as the pedestrian veers off of the crosswalk (e.g., "J-walks"), which may similarly indicate that the pedestrian does not have right of way to enter the intersection.

However, the autonomous vehicle can implement any other method or technique to detect the pedestrian in or near the crosswalk and to adjust the crossing confidence score for the autonomous vehicle—in real-time—based on the pedestrian's location, actions, and derived intent to cross the intersection.

7.2 Group of Pedestrians

In a similar implementation, the autonomous vehicle detects a group of (e.g., two or more) pedestrians occupying a corner of the sidewalk adjacent the crosswalk and calculates a crossing confidence score based on locations and actions of these pedestrians as a group.

For example, in this implementation, a group of pedestrians occupying the sidewalk adjacent the autonomous vehicle may obscure the autonomous vehicle's view of the intersection (e.g., vehicles near and approaching the intersection, a traffic signal, etc.). The autonomous vehicle can therefore calculate a crossing confidence score based on whether these pedestrians remain on the sidewalk or enter the crosswalk rather than (or with greater weight than) a state of the intersection or vehicles near the intersection detected in scan data recorded by the autonomous vehicle. Therefore, the autonomous vehicle can: detect a group of pedestrians occupying the sidewalk adjacent the crosswalk in Block S122; calculate a low confidence score (e.g., predict that the autonomous vehicle does not have right of way to enter the intersection) in Block S130 while all or a large proportion of the group remains on the sidewalk; and calculate a high(er) confidence score (e.g., predict right of way of the autonomous vehicle to enter the intersection) in Block S140 in response to detecting a subset of pedestrians—exceeding a threshold proportion of the group of pedestrians—entering the crosswalk together at approximately the same time. Similar to the implementation described above, the autonomous vehicle can also monitor an average speed of the group moving into the crosswalk and adjust the crossing confidence score as a function of the detected speed of the group of pedestrians or a deviation of the average speed of the group from a nominal pedestrian walking speed. The autonomous vehicle can additionally or alternatively adjust the crossing confidence score as a function of (e.g., proportional to) a size and/or a density of the group of pedestrians detected in the crosswalk.

In a similar example, if the autonomous vehicle identifies—in the scan data—at least a threshold number of (e.g., five) pedestrians waiting at a crosswalk adjacent the autonomous vehicle, the autonomous vehicle can calculate a low confidence score for each scan cycle while these pedestrians remain on the sidewalk and then calculate a higher confidence score once these pedestrians begin to cross the crosswalk. Furthermore, in this example, the autonomous vehicle can calculate the crossing confidence score as a function of a proportion of these pedestrians who enter the intersection at substantially similar times, such as by: maintaining a low crossing confidence score if only one or fewer than 30% of the group of pedestrians move across the crosswalk together; calculating a moderate crossing confidence score if between 30% and 70% of the group of pedestrians move across the crosswalk together; and calculating a high crossing confidence score if more than 70% of the group of pedestrians move across the crosswalk together.

Similarly, the autonomous vehicle can calculate the crossing confidence score based on the absolute number of pedestrians or a size of a group of pedestrians who cross the intersection together. For example, if the autonomous vehicle identifies more than eight pedestrians crossing the intersection together or a group of pedestrians spanning at least half the width of the intersection crossing the intersection together—despite a right of way of the intersection or a current rate of speed of road vehicles approaching the intersection—the autonomous vehicle can determine that these pedestrians have commanded the intersection and calculate a high crossing confidence score for the intersection accordingly (e.g., if the autonomous vehicle closely follows this group of pedestrians across the intersection).

Furthermore, in this and the foregoing implementations, the autonomous vehicle can automatically follow close behind or beside the single pedestrian or subset of pedestrians moving through the crosswalk to the opposing sidewalk in Block S170 if the crossing confidence score exceeds a preset threshold score, as described below. In particular, if the crossing confidence score exceeds a threshold score, the autonomous vehicle can follow (i.e., move with) the group of pedestrians across the crosswalk to the opposite side of the street. For example, if the autonomous vehicle identifies at least six pedestrians waiting at the crosswalk with the autonomous vehicle and then determines that three of these pedestrians have begun to walk across the crosswalk within a three-second period, the autonomous vehicle can calculate a crossing confidence score sufficiently high to trigger the autonomous vehicle to follow these three pedestrians across the street. The autonomous vehicle can then track velocities of these three pedestrians moving across the crosswalk and follow these pedestrians accordingly, such as: by calculating an average velocity vector of these three pedestrians and navigating according to each subsequent velocity vector between each scan cycle; following behind the fastest-moving of these pedestrians; or following behind the pedestrian most centered within markers delineating the crosswalk. As the autonomous vehicle approaches the far end of the crosswalk, the autonomous vehicle can also deviate from following these pedestrians and toward a waypoint defined at a sidewalk ramp on the far end of the crosswalk, such as if these pedestrians enter the far sidewalk from a curb. Alternatively, in this example, when the autonomous vehicle calculates a crossing confidence score that exceeds a threshold score, the autonomous vehicle can navigate directly to one or more preset waypoints along the crosswalk—such as defined in the navigation map—between the near sidewalk and the opposing sidewalk, such as at a preset speed or at a speed corresponding to a maximum or average speed of the pedestrians currently crossing the street.

7.3 Cross-Street Pedestrian Tracking

The autonomous vehicle can implement similar methods and techniques to identify and track pedestrians on an opposing sidewalk at the intersection in Block S122 and to adjust the crossing confidence score based on locations and/or actions of these pedestrians. For example, the autonomous vehicle can: detect a pedestrian occupying the opposing sidewalk at a first time; calculate a low crossing confidence score in Block S130 while this pedestrian remains on the opposing sidewalk; track the pedestrian's entry into the opposing end of the crosswalk at a subsequent time; and calculate a high(er) crossing confidence score in Block S140 as this pedestrian moves across the crosswalk, such as if the pedestrian moves through the crosswalk at a rate within a range of common human walking speeds.

In this implementation, the autonomous vehicle can thus implement methods and techniques described above to adjust a crossing confidence score based on actions of a pedestrian standing near an opposing end of the crosswalk and a derived intent of this pedestrian to enter the same crosswalk that the autonomous vehicle is preparing to cross.

The autonomous vehicle can also: implement similar methods and techniques to detect and track pedestrians standing near and then entering a second crosswalk perpendicular to the crosswalk that the autonomous vehicle is preparing to cross; and adjust the crossing confidence score accordingly in Blocks S130 and S140. For example, the autonomous vehicle can: identify a second pedestrian occupying a second crosswalk perpendicular to the crosswalk (i.e., perpendicular to the autonomous vehicle's assigned navigation route); implement methods and techniques described above to characterize or quantify the second pedestrian's intent to cross this second crosswalk. Thus, in response to identifying the second pedestrian occupying the second crosswalk and predicting that the second pedestrian intends to cross the second crosswalk in Block S122, the autonomous vehicle can reduce the crossing confidence score for entering the crosswalk given a low probability that both the autonomous vehicle has the right of way to enter the crosswalk and the second pedestrian has the right of way to enter the second, perpendicular crosswalk.

Furthermore, if the autonomous vehicle calculates a high crossing confidence score in Block S140 responsive to detecting a pedestrian entering the crosswalk coinciding with the autonomous vehicle's assigned navigation route, the autonomous vehicle can predict that the autonomous vehicle has the right of way to enter the intersection. However, if the autonomous vehicle detects a second pedestrian entering the second (perpendicular) crosswalk soon thereafter, the autonomous vehicle can withdraw this prediction of the autonomous vehicle's right of to enter the intersection or otherwise reduce the calculated crossing confidence score. Responsive to dissonance between actions of these pedestrians, the autonomous vehicle can also transmit a query to a remote operator portal for manual confirmation to enter the intersection in Block S160, as described below.

7.3 Road Vehicle Tracking

As shown in FIGS. 1, 2, and 3, one variation of the method S100 further includes detecting a vehicle approaching the intersection in optical data recorded over a first period of time in Block S124. In this variation, the autonomous vehicle can calculate a crossing confidence score as an inverse function of a velocity of this vehicle in Block S130. In this variation, the method S100 can also include detecting the vehicle slowing toward the crosswalk in optical data recorded over a subsequent period of time in Block S124;

and the autonomous vehicle can thus calculate a higher crossing confidence score as a function of the vehicle slowing toward the crosswalk in Block 140.

Generally, in this variation, the autonomous vehicle can calculate a crossing confidence score based on states of vehicles detected at and approaching the intersection, such as in combination with states of pedestrians detected near the intersection or in replacement of a pedestrian-based crossing confidence score when the autonomous vehicle detects an insufficient number of pedestrians at the intersection.

For example, the autonomous vehicle can implement computer vision techniques to identify other vehicles approaching the intersection perpendicular to the crosswalk (e.g., on the left lateral and right lateral sides of the vehicle). The computing device can then: compare positions of these vehicles, in consecutive scan data to calculate a velocity (i.e., speed and direction) of each vehicle approaching the intersection; confirm that each road vehicle is slowing upon approach to the intersection; estimate a distance from each road vehicle to the crosswalk; and then calculate a confidence score that each road vehicle will come to a stop prior to reaching the crosswalk based on the road vehicle's rate of deceleration and the remaining distance between the intersection and road vehicle. The autonomous vehicle can then calculate or adjust the crossing confidence score in Blocks S130 and S140 accordingly.

The autonomous vehicle can also track both pedestrians standing near the intersection and road vehicles approaching the intersection and generate a crossing confidence score for navigating across the crosswalk based on the presence of approaching road vehicles, the speed of these road vehicles, and motions of these pedestrians. For example, the autonomous vehicle can: default to tracking pedestrians standing at the intersection near the autonomous vehicle; identify and track approaching road vehicles once the pedestrian(s) moves into the intersection, since movement of these pedestrians may improve the autonomous vehicle's view of the road vehicles near the intersection; and then calculate a crossing confidence score as a function of motion characteristics of the pedestrians moving into the intersection and states of other road vehicles stopped at or slowing toward the crosswalk (e.g., inversely proportional to speeds of vehicles approaching the intersection perpendicular to crosswalk) in Block S140. The autonomous vehicle can then automatically follow the pedestrians across the intersection in Block S170 or query a remote operator portal for manual confirmation to enter the crosswalk in Block S160 if the crossing confidence score exceeds the threshold score.

7.5 Autonomous Vehicle Intent

In one variation shown in FIG. 1, the autonomous vehicle can actively communicate its intent to cross the intersection to approaching road vehicles (and pedestrians and bicyclists nearby) while occupying a sidewalk and facing the crosswalk. In one implementation, to communicate its intent to navigate across the crosswalk, the autonomous vehicle can move forward off of the sidewalk and onto the road surface adjacent the crosswalk, while remaining some distance from a nearest lane marker demarcating a road surface designated for road vehicles.

For example, the autonomous vehicle can calculate a target intent position representing a maximum distance that the autonomous vehicle may move from the sidewalk into the crosswalk while limiting risk of impact with a road vehicle entering the intersection, such as based on a speed of a road vehicle approaching on the same side of the road currently occupied by the autonomous vehicle, a current distance from this road vehicle to the intersection, and/or a current speed or rate of deceleration of the road vehicle. In this example, if the approaching road vehicle is moving at a relatively slow speed, is at a significant distance (e.g., more than 100 meters) from the crosswalk, and/or is slowing down, the autonomous vehicle can: calculate a target intent position that places the autonomous vehicle in the crosswalk thirty centimeters past the nearest lane demarcating the road surface; navigate to this target intent position in order to visually indicate to the approaching road vehicle the autonomous vehicle's intent to enter the crosswalk; and calculate a high crossing confidence score in Block S140 if the approaching road vehicle begins or continues to decelerate at a rate suitable to avoid collision with the autonomous vehicle. However, if the autonomous vehicle fails to detect suitable deceleration of the road vehicle, the autonomous vehicle can calculate a low crossing confidence score and automatically navigate back onto the adjacent sidewalk in order to avoid collision with the road vehicle as the road vehicle passes the crosswalk. Similarly, if the approaching road vehicle is moving at a relatively high speed and/or is a short distance (e.g., less than twenty-five meters) from the crosswalk vehicle, the autonomous vehicle can maintain a low crossing confidence score and remain on the sidewalk until this road vehicle passes the crosswalk.

In the foregoing example, the autonomous vehicle can identify and track a cyclist approaching the intersection perpendicular to the crosswalk and avoid entering the intersection to indicate its intent to cross the intersection until the cyclist has passed the crosswalk.

In this variation, the autonomous vehicle can additionally or alternatively oscillate along its anteroposterior axis (i.e., "back and forth") or about its yaw axis in Block S114 in order to visually communicate its intent to cross the intersection to road vehicles, cyclists, and/or pedestrians, etc. near or approaching the intersection. For example, the autonomous vehicle can oscillate along its anteroposterior axis at a frequency of 0.5 Hz over an amplitude of ten centimeters while on the sidewalk facing the crosswalk, while on a sidewalk ramp facing the crosswalk, or once the autonomous vehicle has moved onto the road surface to indicate its intent, as described above, in Block S114. In this example, the autonomous vehicle can also track approaching vehicles and oscillate at amplitudes: proportional to the distance between the autonomous vehicle and an approaching road vehicle; or proportional to a speed of the approaching road vehicle.

As described above, the autonomous vehicle can implement computer vision techniques to track approaching road vehicles and to confirm that these approaching road vehicles are responding to the autonomous vehicle communicating its intent to cross the intersection by slowing down. For example, if the autonomous vehicle determines that an approaching road vehicle is not slowing down despite advancement onto the road surface or despite oscillation of the autonomous vehicle, the autonomous vehicle can cease oscillating, reverse back onto the adjacent sidewalk, and calculate a low crossing confidence score in Block S130. Once the road vehicle has passed the intersection, the autonomous vehicle can repeat the foregoing methods and techniques to track road vehicles and pedestrians at or approaching the intersection in Blocks S122 and S124, to communicate its intent to cross the intersection, and to calculate crossing confidence scores based on locations and actions of these pedestrian and road vehicles in Blocks S130 and S140.

8. Stop-Controlled Intersections

In another variation, the autonomous vehicle calculates a crossing confidence score for a stop-controlled intersection occupied by the autonomous vehicle. In this variation, the autonomous vehicle can implement methods and techniques described above to calculate a crossing confidence score for a stop-controlled intersection but begin with a higher baseline confidence score or implement a lower threshold score for the stop-controlled intersection responsive to a higher likelihood that a driver of a road vehicle will stop at the intersection (e.g., compared to a yield sign or crosswalk sign that a driver may be more likely to ignore or less likely to see, understand, and heed while driving).

In this variation, the autonomous vehicle can implement computer vision techniques to identify stop signs—facing road vehicles approaching the crosswalk—in scan data collected by the autonomous vehicle and then calculate a crossing confidence score accordingly in Block S130. Alternatively, the autonomous vehicle can determine that the intersection is a stop-controlled intersection from an intersection type label associated with the intersection in the navigation map, as described above.

However, the autonomous vehicle can implement any other methods and techniques described above and below to calculate a crossing confidence score for a stop-controlled intersection, to communicate its intent to cross a stop-controlled intersection, and to cross a stop-controlled intersection when a crossing confidence score exceeds a threshold score.

9. Signal-Controlled Intersections

In another variation shown in FIG. 2, the autonomous vehicle calculates a crossing confidence score for a signal-controlled intersection, such as including automated pedestrian right-of-way signage. In this variation, the autonomous vehicle can implement methods and techniques described above to track road vehicles and pedestrians occupying and approaching the intersection. The autonomous vehicle can also: identify lighted traffic signals in scan data collected by the autonomous vehicle when located near the intersection; extract right of way information from these lighted traffic signals in Block S128; and then calculate crossing confidence scores, such as a weighted function of the right of way information extracted from states of the lighted traffic signals, velocities of road vehicles near and approaching the intersection, and/or locations and actions of pedestrians near the intersection, etc. in Blocks S130 and S140, as shown in FIG. 3.

9.1 Lighted Signal Detection

In one implementation, the autonomous vehicle implements template matching, object recognition, edge detection, and/or other computer vision techniques to detect a traffic light and/or a crosswalk signal in scan data collected by the autonomous vehicle. The autonomous vehicle can then: match color intensities (e.g., in the red, green, and blue spectrums) in a region of scan data corresponding to a traffic signal to one of a "stop," "yield," and "go" action signal; and then predict future motion of vehicles facing the traffic signal based on the current action signal. The autonomous vehicle can additionally or alternatively implement optical character recognition to read "walk," "don't walk," and cross time rendered by the crosswalk signal from scan data to determine a current state of the crosswalk. The computer system can then calculate a higher crossing confidence score for the intersection if the traffic signal aligned with the crosswalk shows "green" and/or if the crosswalk signal shows "walk" with a timer reading an amount of time sufficient for the autonomous vehicle to navigate across the crosswalk. The autonomous vehicle can also calculate an elevated crossing confidence score in response to detecting pedestrians moving across the same crosswalk and/or detecting road vehicles stopped on each side of the crosswalk.

(In the foregoing implementation, the autonomous vehicle can also reference a navigation map containing a representation of the intersection to confirm the real positions of each traffic signal and crosswalk signal identified in scan data recorded in Block S120. The autonomous vehicle can also label the navigation map with the identified states of traffic signals and crosswalk signals at the intersection, which a remote computer system can confirm based on similar data received from other autonomous vehicles at the intersection or based on a master traffic signal map. The computer system can also compile such current, labeled navigation maps received from multiple autonomous vehicles, which the autonomous vehicle can leverage to improve confidence that the determined right of way at the intersection is correct.)

In the foregoing implementation, the autonomous vehicle can implement computer vision techniques to analyze scan data for the lighted traffic signal and/or lighted crosswalk signal. Alternatively, the autonomous vehicle can: retrieve a geospatially-referenced signal mask previously generated for the intersection; determine a position and orientation of the autonomous vehicle relative to a real or virtual reference feature (e.g., a reference object at the intersection, a geospatial reference coordinate) at a time the last scan data was recorded; project the signal mask onto the scan data based on the position and orientation of the autonomous vehicle at the time the scan data was recorded; and implement computer vision techniques to extract traffic signal and/or crosswalk signal data from a region of the scan data bounded by the signal mask. The autonomous vehicle can thus extract right of way data from select regions of the scan data based on a known position and orientation of the autonomous vehicle relative to the intersection, thereby reducing a total amount of time and/or processing load necessary to transform a scan data into traffic signal-based right of way value.

The autonomous vehicle can then calculate a crossing confidence score based on a right of way determined from one or both of a traffic signal and/or a crosswalk signal. Furthermore, in this implementation, the autonomous vehicle can prompt a human operator to assume control of the autonomous vehicle or to make a cross decision if the autonomous vehicle identifies a mismatch between a state of the traffic signal and a state of the crosswalk signal.

In this implementation, the autonomous vehicle can also determine a length of time remaining for the autonomous vehicle to cross the street, such as by extracting this time directly from the crosswalk counter or by tracking times of signal changes at the intersection. Once the autonomous vehicle determines that it has right of way to cross the intersection, the autonomous vehicle can predict a duration of time needed to cross the street, such as based on a typical or preset speed of the autonomous vehicle, an amount of pedestrian traffic at each end of the crosswalk, and minimum or average speed of pedestrians moving toward and away from the autonomous vehicle along the crosswalk, etc. The computer system can then calculate a higher crossing confidence score for the intersection if the crosswalk timer adjacent the crosswalk signal reads an amount greater than (or within two seconds of) the calculated time necessary for the autonomous vehicle to navigate across the crosswalk.

The autonomous vehicle can repeat these methods and techniques with each sampling period (e.g., for each scan data collected by the autonomous vehicle at a frame rate of 10 Hz) to: calculate a crossing confidence score; to wait or to navigate across the street based on a comparison between the crossing confidence score and a threshold score; and/or to selectively involve a human operator to enter a navigation decision for the autonomous vehicle.

Furthermore, in this variation, if the autonomous vehicle determines that its view of a traffic signal (e.g., at a georeferenced location indicated in the navigation map) is obscured, such as by a pedestrian or road vehicle near the intersection, the autonomous vehicle can decrement a weight assigned to a traffic signal state and increment a weight assigned to pedestrian actions in a function implemented by the autonomous vehicle to calculate the crossing confidence score. For example, the autonomous vehicle can implement the foregoing methods and techniques to: determine that the intersection is populated with a lighted traffic signal based on a traffic signal label associated with the intersection in the navigation map; and scan the optical data for the lighted traffic signal to determine right of way at the intersection. In response to detecting obstruction of the lighted traffic signal in the field of view of optical sensors in the autonomous vehicle, the autonomous vehicle can: scan these optical data for pedestrians proximal a known location of the crosswalk, such as indicated in the navigation map; predict lack of right of way of the autonomous vehicle to enter the intersection (e.g., a low crossing confidence score) in Block S130 based on presence of the pedestrian on the sidewalk adjacent the crosswalk; and then predict possession of right of way of the autonomous vehicle to enter the intersection (e.g., a high crossing confidence score) in Block S140 based on presence of the pedestrian in the crosswalk at a later time, as described above.

9.2 Nearby Intersections

The autonomous vehicle can also implement similar methods and techniques to: identify lighted traffic signals at other intersections further to the left, to the right, ahead of, and/or behind the autonomous vehicle in scan data; to estimate a state of these other intersections based on states of these other lighted traffic signals; and to calculate a corresponding crossing confidence score for the intersection currently occupied by the autonomous vehicle based on the states of these other nearby intersections. For example, the autonomous vehicle can: implement methods and techniques described above to extract right of way information for these nearby intersections from scan data; identify vehicles between the intersection currently occupied by the autonomous vehicle and these nearby intersections; and calculate a crossing confidence score that is inversely proportional to a number of road vehicles moving through these nearby intersections and toward the intersection occupied by the autonomous vehicle.

10. Future Intersection State Prediction

In one variation, the autonomous vehicle implements an intersection model to predict a future state of the intersection currently occupied by the autonomous vehicle. Generally, in this variation, the autonomous vehicle can implement computer vision techniques, such as described above, to extract various features from scan data, and then: passes these features into an intersection model to predict a future state of the intersection (e.g., at a next scan cycle); and confirms the validity of the model for the intersection occupied by the autonomous vehicle based on a degree to which the predicted future state and the actual subsequent state of the intersection match. If the model is sufficiently valid, the autonomous vehicle then passes new features into the model to predict a future state of the intersection and calculates a crossing confidence score for crossing the intersection accordingly.

In this variation, the autonomous vehicle can implement: a general intersection model; an intersection model unique to the intersection type (e.g., two-way uncontrolled intersection model, four-way signal-controlled intersection model) occupied by the autonomous vehicle; an intersection model unique to the intersection type and corresponding to a particular range of road vehicles and/or pedestrians also occupying the intersection; or an intersection model unique to the specific intersection occupied by the autonomous vehicle (e.g., generated by a remote computer system based on data collected by other autonomous vehicles that passed through the intersection previously); etc. For example, the autonomous vehicle can retrieve an intersection model—from an intersection model database—most relevant to the intersection currently occupied by the autonomous vehicle, such as based on an intersection model pointer associated with the intersection in the navigation map.

At a first time, the autonomous vehicle can: generate a first scan from data output by various sensors integrated into the autonomous vehicle; and then pass features extracted from the first scan into the intersection model to predict a state of the intersection at a second, future time (e.g., one second later). For example, the autonomous vehicle can extract various features from the first scan, including: location, orientation, velocity, and size of road vehicles at and approaching the intersection; a length of a crosswalk or width of a street at the intersection; a number of pedestrians and their positions and orientations near the crosswalk; states of traffic and crosswalk signals at the intersection; etc. and then pass these quantitative values representative of these features into the intersection model. At the second time, the autonomous vehicle can: generate a second scan from data output by various sensors integrated into the autonomous vehicle at approximately the second time; calculate a confidence score for the intersection model based on a degree of similarity between the predicted state of the intersection at the second time and the second scan. For example, the autonomous vehicle can calculate a confidence score for the intersection model as a function of the degree to which predicted positions of vehicles, pedestrians, and other (moving) objects represented in the predicted state of the intersection align with the real positions of these vehicles, pedestrians, and other objects represented in the scan data collected at the second time. In particular, the autonomous vehicle can calculate a confidence score for the intersection model as an inverse function of divergence between the predicted state of the intersection (e.g., at a future scan cycle) and the actual future state (e.g., at the future scan cycle).

If the confidence score for the intersection model exceeds a threshold score, the autonomous vehicle can then: implement similar methods and techniques to predict a state of the intersection at a third time further in the future; and implement methods and techniques described above to calculate a crossing confidence score for the intersection based on the predicted future state of the intersection (and based on a difference between the current state of the intersection, the predicted future state of the intersection, and a duration of time therebetween). Thus, if the autonomous vehicle calculates a crossing confidence score—for the predicted future state of the intersection—that exceeds the threshold score, the autonomous vehicle can begin navigating across the intersection at a preferred time determined from the predicted future state of the intersection. However, if the autonomous vehicle calculates a cross confidence score that is less than the threshold score, the autonomous vehicle can delay crossing the intersection and instead repeat the foregoing methods and techniques to retest the validity of the intersection model and to recalculate a crossing confidence score for the intersection.

However, if the confidence score for the intersection model is less than a threshold score, the autonomous vehicle can prompt a human operator to enter a crossing decision or to take remote control of the autonomous vehicle, as described below. Alternatively, the autonomous vehicle can repeat this process to predict a state of the intersection further into the future, can implement methods and techniques described above to calculate a crossing confidence score for the intersection accordingly, can fuse the crossing confidence score and the confidence score for the intersection model into a composite crossing confidence score, and then navigate across the intersection if the composite crossing confidence score exceeds a threshold score.

10.1 Other Triggers

In the foregoing variation, the autonomous vehicle can execute these methods and techniques to predict the autonomous vehicle's right of way to enter the crosswalk at a future time with minimal risk of collision with a road vehicle without relying on traffic signage or a traffic signal to hold the crossing for the autonomous vehicle.

For example, the autonomous vehicle can execute methods and techniques described above to identify traffic signage, to extract right of way information from such traffic signage, to track vehicles and pedestrians entering and leaving the intersection, etc. and to transform these features into a crossing confidence score. However, if a threshold duration of time has passed (e.g., 90 seconds) but the autonomous vehicle has not yet calculated a crossing confidence score that exceeds a preset threshold score, the autonomous vehicle can transition to: confirming validity of an intersection model; predicting a future state of the intersection; and calculating a crossing confidence score for the intersection based on alignment between the predicted and actual future states of the intersection. The autonomous vehicle can then cross the street in Block S170 (or query a remote operator portal for confirmation to cross the street) when this alternate crossing confidence score exceeds a threshold score and regardless of the states of traffic and crosswalk signals at the intersection or motion of other pedestrians nearby.

Alternatively, the autonomous vehicle can execute the foregoing methods in parallel, including: calculating a first crossing confidence score based on right of way determined from states of traffic and crosswalk signals, presence and velocities of road vehicles, and pedestrian locations and actions; and calculating a second crossing confidence score based on predicted future states of the intersection output by the intersection model, adjusted for alignment between predicted and actual future states of the intersection. The autonomous vehicle can then cross the street in Block S170 (or query a remote operator portal for confirmation to cross the street) when one or both of the first and second crossing confidence scores exceeds the threshold score; or the autonomous vehicle can merge the first and second crossing confidence scores into a single composite confidence score.

11. Autonomous Actions

In one variation, the method S100 includes autonomously navigating from the sidewalk into the crosswalk and autonomously navigating along the crosswalk to an opposing sidewalk according to the navigation route in Block S170 in response to predicting the right of the autonomous vehicle to enter the intersection, as shown in FIGS. 1 and 3. In this variation, the autonomous vehicle can regularly implement the foregoing methods and techniques to record new scan data, to transform features detected in these scan data in crossing confidence scores, and to compare these crossing confidence scores to a preset threshold (or to preset low and high threshold scores), such as at a rate of 10 Hz. For example, the autonomous vehicle can implement a generic threshold score or an intersection-specific threshold score, such as assigned to the intersection in the navigation map. If the autonomous vehicle is currently stopped on the sidewalk and the last calculated crossing confidence score (or preceding contiguous sequence of crossing confidence scores) exceeds the threshold score, the autonomous vehicle can automatically resume navigation across the intersection.

Similarly, the autonomous vehicle can execute the foregoing methods while slowing upon approach to the intersection and then accelerate back to a target speed and resume navigation through the crosswalk if the last calculated crossing confidence score (or preceding contiguous sequence of crossing confidence scores) exceeds the threshold score. For example, the autonomous vehicle can: autonomously navigate toward and slow upon approach to a region of the sidewalk adjacent the crosswalk in Block S110; and autonomously navigate continuously from the sidewalk into the crosswalk in Block S170 in response to detecting the pedestrian entering the crosswalk and predicting right of the autonomous vehicle to enter the intersection accordingly in Block S140 prior to arrival of the autonomous vehicle at the region of the sidewalk.

In one implementation, the autonomous vehicle can navigate through a sequence of preset waypoints geospatially referenced along the crosswalk, such as including: a first waypoint defined—in the navigation map—at a ramp from the sidewalk occupied by the autonomous vehicle onto the road surface; a second waypoint defined at a pedestrian via a median; and a third waypoint defined at a ramp from the road surface onto the opposing sidewalk.

Alternatively, the autonomous vehicle can: identify features within a current scan, such as sidewalk ramps, pedestrians, and road tape outlining the crosswalk; and dynamically define waypoints along the crosswalk and sidewalk ramps based on these features. For example, upon resuming autonomous navigation in Block S170, the autonomous vehicle can: navigate from the sidewalk into the crosswalk via a near ramp; autonomously follow within a threshold distance of a pedestrian as the pedestrian moves through the crosswalk; veer from behind the pedestrian to a far ramp between the crosswalk and the opposing sidewalk; and autonomously navigate up the far ramp onto the opposing sidewalk.

In the foregoing implementations, the autonomous vehicle navigates through the sequence of waypoints at a preset, standard speed corresponding to a human walking speed (e.g., 5 kilometers per hour). Alternatively, the autonomous vehicle can track the speed of pedestrians moving across the crosswalk near the autonomous vehicle and can navigate through the sequence of waypoints at an average or median speed of these pedestrians. The autonomous vehicle can also implement the forgoing methods and techniques to continue to track right of way at the intersection, a crosswalk timer, etc. and can increase its speed if determined necessary to reach the opposing sidewalk before the crosswalk timer expires. Similarly, the autonomous vehicle can continue to predict future states of the intersection and increase its speed across the crosswalk in order to reach the opposing sidewalk sooner if the intersection model predicts increased likelihood of collision with a road vehicle while the autonomous vehicle is within the intersection.

12. Remote Operator Assistance

Another variation of the method S100 shown in FIG. 2 includes, in response to the second confidence score exceeding a first threshold score: transmitting a query to a remote operator portal to confirm entry of the autonomous vehicle into the crosswalk in Block S160; transmitting a portion of the scan data to the remote operator portal in Block S162; holding at the sidewalk adjacent the crosswalk in Block S110; and then autonomously navigating from the sidewalk into the crosswalk and autonomously navigating along the crosswalk to an opposing sidewalk according to the navigation route in Block S170 in response to confirmation to enter the crosswalk from the remote operator portal. In this variation, if the autonomous vehicle calculates a crossing confidence score (or a sequence of crossing confidence scores) that exceeds the threshold score, the autonomous vehicle can transmit a request to the remote computer system for assistance, and the remote computer system can automatically connect the autonomous vehicle to a remote human operator at a remote operator portal. The autonomous vehicle can also stream various sensor data (e.g., color video data) to the remote operator portal in Block S162 to enable the remote human operator to view the scene around the autonomous vehicle and to confirm whether the autonomous vehicle has right of way to enter the intersection. Upon receipt of confirmation from the remote human operator to enter the intersection, the autonomous vehicle can then resume navigation in Block 170.

In particular, the autonomous vehicle can: approach an intersection; stop at the intersection; collect and analyze data from the scene around the intersection while stopped; query the remote human operator for assistance once certain conditions are met based on features extracted from these data; and then resume motion upon receipt of confirmation from the remote human operator. Alternatively, the autonomous vehicle can: collect and analyze data from a scene nearby in real-time as the autonomous vehicle approaches the intersection; query the remote human operator for assistance if the autonomous vehicle determines that certain conditions are met as the autonomous vehicle continues to move toward the intersection; and continue motion from the sidewalk, into the crosswalk or street, and across the intersection upon receipt of confirmation from the remote human operator while the autonomous vehicle remains in motion.

Therefore, in this variation, the autonomous vehicle can autonomously navigate from the sidewalk into the crosswalk in response to both the confidence score exceeding the threshold score and upon receipt of confirmation entered manually by a remote human operator at the remote operator portal. Alternatively, upon transmitting a query to the remote operator portal for manual assistance in Block S160, the autonomous vehicle can cede control to the remote human operator via the remote operator portal. The remote human operator can then manually guide the autonomous vehicle through the crosswalk and then return autonomous control to the autonomous vehicle, such as once the autonomous vehicle reaches the opposing sidewalk.

Alternatively, the autonomous vehicle can implement both of the foregoing methods, such as by: automatically resuming autonomous navigation if the last crossing confidence score (or preceding sequence of crossing confidence scores) exceeds a high threshold confidence; and automatically transmitting a query to the remote operator portal for manual assistance if the last crossing confidence score (or preceding sequence of crossing confidence scores) falls between a low threshold score and the high threshold confidence, as shown in FIG. 3. In particular, the autonomous vehicle can transmit the query to the remote operator portal in Block S160 in response to calculating a crossing confidence score that exceeds a low threshold score and that is exceeded by a high threshold score. However, if the crossing confidence score exceeds both the low threshold score and the high threshold score, the autonomous vehicle can: withhold the query to the remote operator portal; autonomously navigate from the sidewalk into the crosswalk; and autonomously navigate along the crosswalk to the opposing sidewalk according to the navigation route in Block S170.

12.1 Serving Visual Data to the Remote Human Operator

In this variation, following a decision to involve the remote human operator, the autonomous vehicle can upload sensor data to the remote human operator to aid the remote human operator in reaching a decision for the autonomous vehicle. For example, the autonomous vehicle can upload a feed of video and/or LIDAR scans to a remote computer system, which can serve these optical data to the remote human operator through an operator portal in (near) real-time. Alternatively, the autonomous vehicle can upload video feeds from all or a subset of color cameras integrated into the autonomous vehicle to the remote computer system for distribution to the operator portal.

Yet alternatively, the autonomous vehicle can filter these sensor data and upload a limited amount of sensor data necessary for the remote human operator to rapidly enter an accurate decision for the autonomous vehicle. In particular, the autonomous vehicle can upload select data to the remote computer system for distribution to the operator portal in order to reduce bandwidth requirements, thereby reducing latency, in order to enable more rapid decisions by the remote human operator and to reduce costs for uploading data from the autonomous vehicle to the remote computer system over a wireless network.

In one implementation shown in FIG. 3, the autonomous vehicle crops frames within a video feed output by a color camera within the autonomous vehicle to one or more smaller visual regions containing data of greater value in generating a decision for the autonomous vehicle and then uploads this cropped region(s) to the remote computer system. For example, the autonomous vehicle can: extract a first rectangular subregion from each frame output by the autonomous vehicle's left-lateral camera and corresponding to a section of road extending from the left side of the autonomous vehicle to 50 meters from the left side of the autonomous vehicle; extract a second rectangular subregion from each frame output by the right-lateral camera and corresponding to a section of road extending from the autonomous vehicle's right side of the autonomous vehicle to 50 meters from the right side of the autonomous vehicle; extract a third rectangular subregion from each frame output by the autonomous vehicle's forward-facing camera and corresponding to the opposing sidewalk and a crosswalk signal ahead of the autonomous vehicle; and serve these relatively narrow frame regions of these video feeds to the remote computer system (e.g., over a cellular network) for distribution to the operator portal in near real-time.

In another example, the autonomous vehicle selectively reduces the resolution of areas of each frame output by the left-lateral, right-lateral, and forward-facing cameras outside of these first, second, and third regions before uploading these selectively-compressed video feeds to the remote computer system. The autonomous vehicle can thus upload video feeds that maintain: higher resolution over regions containing visual information of greater value to the remote human operator in reaching a decision for the autonomous vehicle; and lower resolution elsewhere, thereby enabling the remote human operator viewing these video feeds to view specific areas of interest at higher resolution and to view these areas of interest in the context of surfaces nearby shown at lower resolutions.

In this implementation, the autonomous vehicle can serve predefined regions of frames in these video feeds to the remote human operator. For example, these predefined regions can be unique to the remote human operator, such as based on visual regions requested previously by the remote human operator when assisting autonomous vehicles attempting to enter the same intersection. Alternatively, these predefined regions can be specific to the intersection or to a type of intersection occupied by the autonomous vehicle, such as assigned by the remote computer system or defined in the navigation map. For example, the remote computer system can calculate these predefined regions based on sections of image data requested or selected previously by the same or other remote human operators prompted to enter decisions for the same or similar autonomous vehicles attempting to cross the same intersection. The autonomous vehicle can then implement methods and techniques described above to project a geospatially-referenced crop region onto a video feed based on the real location and orientation of the autonomous vehicle relative to a geospatial reference point.

In a similar example, the autonomous vehicle can record a color video feed of the scene proximal the autonomous vehicle via a color camera integrated into the autonomous vehicle in Block S110. Upon transmitting a query for manual assistance to the remote operator portal in Block S160, the autonomous vehicle can also: query a navigation map for a georeferenced area of interest associated with the intersection (e.g., one or more georeferenced areas of interest including a traffic signal, pedestrian signal, the crosswalk, and oncoming traffic lanes bisecting the crosswalk); crop frames in the color video feed around the georeferenced region of interest; and transmit these cropped frames in the color video feed to the remote computer system, via wireless communication protocol, for distribution to the remote operator portal. The remote computer system can then serve these cropped frames and autonomous navigation confirmation controls to a remote operator portal assigned to the autonomous vehicle.

Yet alternatively, the autonomous vehicle can serve compressed (e.g., low-resolution) video feeds to the operator portal, and the remote human operator can drag a window of these video feeds to select relevant areas of these video feeds. The remote computer system can serve definitions (e.g., geometries, positions) of these windows back to the autonomous vehicle; and the autonomous vehicle can map these windows onto their respective video feeds and selectively decrease the resolution of regions of these video feeds outside of these windows before serving next frames in these video feeds to the operator portal. Similarly, the autonomous vehicle can crop regions of these video feeds outside of these windows and upload only these cropped regions of frames in these video feeds to the remote computer system for distribution back to the operator portal.

In the foregoing variation, the remote computer system can: store the remote human operator's selection of a region of interest in a video feed received from the autonomous vehicle; and can later apply this selection to future instances in which the same or other remote human operator is requested to enter a decision for the same or similar autonomous vehicle occupying the same or similar intersection. For example, the remote computer system can merge (e.g., average) the remote human operator's window selection with other window selections entered by the same or other operators for autonomous vehicles occupying the same intersection to calculate a composite window defining a composite region of interest within a video feed recorded by cameras arranged in a particular location on or across a fleet of similar autonomous vehicles. In this example, upon entering the same or similar intersection, an autonomous vehicle within this fleet can: retrieve a position and geometry of this composite window from the computer system, such as based on a pointer to this composite window stored in the navigation map; project the composite window onto a video feed from a camera in the particular location on the autonomous vehicle based on the real position and orientation of the autonomous vehicle relative to a geospatial reference coordinate or to a real reference feature at the intersection; and then automatically serve a region of the video feed bounded by this composite window to the remote human operator exclusive of other regions of this video feed. Once the composite window is thus defined by the remote computer system from window selections entered by remote human operators assisting autonomous vehicles attempting to enter this intersection over time, the autonomous vehicle can serve visual content from the same window to a remote human operator—as needed to enable the human operator to elect a suitable a crossing decision—in Block S162 despite variations in the real location and orientation of the autonomous vehicle each time the autonomous vehicle approaches the intersection, such as when the autonomous vehicle navigates to a unique location facing the same intersection in order to avoid a pedestrian or in order to avoid an obstacle obscuring the autonomous vehicle's view features within the intersection.

12.2 Remote Human Operator Decisions

Upon receipt of a request for manual assistance and scan data, select video feeds, and/or other data from the autonomous vehicle, a remote human operator can assume some level of control of the autonomous vehicle. In one implementation, the remote human operator can enter—through the operator portal—binary control to trigger the autonomous vehicle to either enter the intersection or to remain at the sidewalk. For example, upon reviewing scan data received from the autonomous vehicle at the remote operator portal and determining that the autonomous vehicle has right of way or that the intersection is suitable to cross, the remote human operator can select a single "go" or "confirm" button within the operator portal. The computer system can then return this input to the autonomous vehicle to trigger the autonomous vehicle to begin a crossing routine to autonomously navigate through the crosswalk, such as by navigating through a sequence of waypoints or by following behind a pedestrian, as described above.

In the foregoing implementation, the remote human operator can also select, circle, or draw windows around obstacles—such as potholes or road vehicles shown in scan data received from the autonomous vehicle—along the crosswalk, and the remote computer system or the autonomous vehicle can modify a path between the autonomous vehicle's current position and the opposing sidewalk based on obstacles thus identified by the remote human operator. Alternatively, the remote human operator can draw a cursor along a video feed received from this autonomous vehicle and rendered within the operator portal, and the remote computer system or the autonomous vehicle can transform this cursor path into a local navigation path—such as in the form of a sequence of waypoints—between the autonomous vehicle's current location and the opposing sidewalk. The autonomous vehicle can then autonomously traverse these waypoints, as described above, following receipt of confirmation to cross the street from the remote human operator.

However, if the remote human operator determines from scan data received from the autonomous vehicle that the autonomous vehicle does not have right of way, that navigation of the autonomous vehicle through the crosswalk poses undue risk to the autonomous vehicle, or otherwise determines that the autonomous vehicle should not enter the intersection despite the autonomous vehicle's calculation of a crossing confidence score that exceeds the threshold score, the remote human operator can enter a command rejecting the autonomous vehicle's query through the remote operator portal. Following receipt of this rejection from the remote operator portal, the autonomous vehicle can remain stopped on the sidewalk (or navigate to a halt on the sidewalk adjacent the crosswalk), repeat the forgoing methods and technique to recalculate the crossing confidence score, and send a new query to the remote operator portal upon calculating a crossing confidence score that exceeds the (current) threshold score. For example, in response to receipt of rejection to enter the intersection or otherwise resume autonomous navigation through the crosswalk from the remote human operator via the remote operator portal, the autonomous vehicle can: cease transmission of optical data to the remote operator portal; remain stopped at the sidewalk adjacent the crosswalk; calculate a revised confidence score for right of way of the autonomous vehicle to enter the intersection based on features detected in optical data recorded by the autonomous vehicle following receipt of rejection from the remote human operator; and then transmit a second query to the remote operator portal for manual confirmation to enter the intersection in response to the revised confidence score exceeding a second threshold score, wherein the second threshold score exceeds the previous threshold score. The autonomous vehicle can thus implement successively increasing threshold scores following each rejection received from the remote human operator while the autonomous vehicle waits to enter the current crosswalk.

Alternatively, following receipt of rejection from the remote human operator, the remote computer system can queue the autonomous vehicle for additional support from the remote human operator at a preset time (e.g., ten seconds) or operator-elected time (e.g., between five seconds and thirty seconds) following receipt of this rejection, as shown in FIG. 3. The remote computer system can then reconnect the autonomous vehicle and the remote operator portal at the expiration of this time, and the remote human operator can again confirm or reject resumption of autonomous navigation by the autonomous vehicle.

Alternatively, in the foregoing implementations, the remote human operator can assume remote control of the autonomous vehicle via the remote operator portal and can manually navigate the autonomous vehicle through the crosswalk upon receipt of query from the autonomous vehicle in Block 160.

The autonomous vehicle can therefore implement Blocks of the method S100 to selectively request manual assistance from a remote human operator to enter an intersection when the autonomous vehicle is particularly confident that it possesses right of way to execute this navigational action and/or when the autonomous vehicle is particular confident that such navigational action poses limited risk to the autonomous vehicle, thereby preserving both remote human operator bandwidth and wireless data bandwidth and reducing resource consumption (i.e., remote human operator time and wireless data volume) per mile traversed by the autonomous vehicle.

12.3 Other Remote Assistance Triggers

In this variation, the autonomous vehicle can also prompt a remote human operator to provide real-time assistance if the autonomous vehicle is unable to achieve a crossing confidence score that exceeds the threshold score within a threshold period of time. In particular, the autonomous vehicle can implement methods and techniques described above to query a remote operator portal for manual assistance if the autonomous vehicle has remained stopped at an intersection for more than a threshold duration of time, such as a preset maximum halt duration (e.g., one minute) or a maximum halt duration assigned to the intersection in the navigation map. Therefore, the autonomous vehicle can automatically access a remote human operator for navigational assistance if the autonomous vehicle consistently calculates a crossing confidence score that falls below the threshold score over this maximum halt duration.

Alternatively, the autonomous vehicle can dynamically reduce the threshold score (or the low threshold score specifically) as a function of time since arriving at the intersection. In particular, as the autonomous vehicle repeatably recalculates a crossing confidence score for the crosswalk over time, the autonomous vehicle can also reduce the threshold score; once the autonomous vehicle calculates a crossing confidence score that exceeds the current threshold score, the autonomous vehicle can automatically query the remote operator portal for manual assistance in Block S160.

In another implementation, the autonomous vehicle can also selectively query the remote operator portal for manual assistance if the autonomous vehicle calculates one or a sequence of crossing confidence scores that fall within an "unknown" score band (e.g., for crossing confidence scores greater than 50% and less than 80%).

In yet another implementation, the autonomous vehicle can read a threshold score assigned to the intersection or crosswalk—that the autonomous vehicle is preparing to cross—from the navigation map and implement this threshold score as a trigger to selectively query the remote operator portal for assistance in Block S160.

However, the autonomous vehicle can implement any other triggers or techniques to selectively prompt a remote human operator for assistance in Block S160.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for autonomously navigating along a first crosswalk at an intersection by an autonomous vehicle, wherein the method comprises:
   at a first time, autonomously navigating along a first sidewalk toward the first crosswalk at the intersection, wherein the first crosswalk coincides with a navigation route assigned to the autonomous vehicle;
   recording optical data of a scene proximate the autonomous vehicle via an optical sensor integrated into the autonomous vehicle;
   detecting the first crosswalk in the optical data;
   aligning an anteroposterior axis of the autonomous vehicle to the first crosswalk detected in the optical data;
   detecting a first pedestrian proximate the intersection in the optical data;
   determining that the first pedestrian has entered the first crosswalk at a second time based at least in part on the optical data, wherein the second time follows the first time;
   in response to determining that the first pedestrian has entered the first crosswalk at the second time,
      predicting right of way of the autonomous vehicle to enter the intersection; and
   in response to predicting the right of way of the autonomous vehicle to enter the intersection,
      autonomously navigating from the first sidewalk into the first crosswalk; and
      autonomously navigating along the first crosswalk to a second sidewalk according to the navigation route.

2. The method of claim 1, further comprising:
   detecting an unprotected crosswalk label associated with the intersection in a navigation map; and
   determining that the first crosswalk is an unprotected crosswalk based at least in part on the unprotected crosswalk label, wherein detecting the first pedestrian proximate the intersection in the optical data comprises:
      detecting the first pedestrian within the first sidewalk proximate the first crosswalk in optical data recorded over a first period of time, wherein the first period of time precedes the second time,
   wherein the method further comprises, prior to the second time:
      in response to detecting the first pedestrian within the first sidewalk proximate the first crosswalk in the optical data recorded over the first period of time,
         calculating a first confidence score for the right of way of the autonomous vehicle to enter the intersection;
         determining that the first confidence score is less than a first threshold score; and
         in response to determining that the first confidence score is less than the first threshold score, halting on the first sidewalk proximate the first crosswalk,
   wherein predicting the right of way of the autonomous vehicle to enter the intersection comprises:
      in response to determining that the first pedestrian has entered the first crosswalk at the second time,
         calculating a second confidence score for the right of way of the autonomous vehicle to enter the intersection; and
         determining that the second confidence score exceeds the first confidence score, and
   wherein autonomously navigating from the first sidewalk into the first crosswalk comprises:
      in response to determining that the second confidence score exceeds the first confidence score,
         autonomously navigating from the first sidewalk into the first crosswalk.

3. The method of claim 2, further comprising:
   detecting a vehicle approaching the intersection in the optical data recorded over the first period of time;
   determining a first velocity of the vehicle based at least in part on the optical data recorded over the first period of time, wherein the first confidence score is calculated as an inverse function of the first velocity of the vehicle;
   determining a second velocity of the vehicle based at least in part on optical data recorded over a second period of time, wherein the second period of time follows the first period of time; and
   determining that the second velocity is less than the first velocity,
   wherein the second confidence score for the right of way of the autonomous vehicle is calculated based at least in part on the second velocity in response to determining that the second velocity is less than the first velocity.

4. The method of claim 2, wherein autonomously navigating along the first crosswalk to the second sidewalk comprises:
   autonomously navigating from the first sidewalk into the first crosswalk via a near ramp at the intersection, wherein the near ramp extends between at least a portion of the first sidewalk and at least a first portion of the first crosswalk;
   autonomously navigating within the first crosswalk to a far ramp, wherein the far ramp extends between at least a second portion of the first crosswalk and at least a portion of the second sidewalk, and wherein autonomously navigating within the first crosswalk to the far ramp comprises autonomously maintaining at least a threshold distance between the autonomous vehicle and the first pedestrian as the first pedestrian moves through the first crosswalk; and
   autonomously navigating from the first crosswalk to the second sidewalk via the far ramp.

5. The method of claim 1, wherein detecting the first pedestrian proximate the intersection in the optical data comprises:
   detecting the first pedestrian within the second sidewalk proximate the first crosswalk in optical data recorded over a first period of time preceding the second time,
   wherein the method further comprises:
   prior to the second time:
      determining that the first pedestrian is stopped within the second sidewalk based at least in part on the optical data recorded over the first period of time preceding the second time;
      in response to determining that the first pedestrian is stopped within the second sidewalk,
         calculating a first confidence score for the right of way of the autonomous vehicle to enter the intersection;
         determining that the first confidence score is less than a first threshold score; and in response to determining that first confidence score is less than the first threshold score, halting on the first sidewalk proximate the first crosswalk,
wherein predicting the right of way of the autonomous vehicle to enter the intersection comprises:
in response to determining that the first pedestrian has entered the first crosswalk at the second time,
determining a speed of the first pedestrian based at least in part on the optical data;
calculating a second confidence score for the right of way of the autonomous vehicle to enter the intersection as an inverse function of a difference between the speed of the first pedestrian and a predefined nominal pedestrian speed; and
wherein autonomously navigating from the first sidewalk into the first crosswalk comprises:
in response to determining that the second confidence score exceeds the first confidence score, autonomously navigating from the first sidewalk into the first crosswalk and past the first pedestrian.

6. The method of claim 1, wherein detecting the first pedestrian proximate the intersection in the optical data comprises:
detecting a group of pedestrians within the first sidewalk adjacent the first crosswalk, wherein the first pedestrian is one of the group of pedestrians, wherein predicting the right of way of the autonomous vehicle to enter the intersection comprises:
determining that a subset of the group of pedestrians has entered the first crosswalk at approximately the second time based at least in part on the optical data;
determining that the subset of the group of pedestrians exceeds a threshold proportion of the group of pedestrians; and
in response to determining that the subset of the group of pedestrians exceeds the threshold proportion, predicting the right of way of the autonomous vehicle to enter the intersection, and
wherein autonomously navigating along the first crosswalk to the second sidewalk comprises:
autonomously following at least some of the subset of pedestrians along the first crosswalk to the second sidewalk.

7. The method of claim 1, further comprising:
detecting a second pedestrian within a second crosswalk perpendicular to the first crosswalk at approximately the second time; and
in response to detecting the second pedestrian within the second crosswalk:
withdrawing a prediction of the right of way of the autonomous vehicle to enter the intersection; and
transmitting a query to a remote operator portal for manual confirmation to enter the intersection.

8. The method of claim 1, further comprising:
detecting a traffic signal label associated with the intersection in a navigation map;
determining that the intersection is populated with a lighted traffic signal based on the traffic signal label associated with the intersection in the navigation map; and
scanning the optical data for the lighted traffic signal to determine right of way at the intersection;
wherein identifying the pedestrian proximate the intersection in the optical data comprises:
determining that the lighted traffic signal is obstructed based at least in part on the optical data;
in response to determining that the lighted traffic signal is obstructed,
scanning the optical data for pedestrians proximate a location of the first crosswalk indicated in the navigation map; and
detecting the first pedestrian on the first sidewalk adjacent the first crosswalk prior to the second time,
wherein predicting the right of way of the autonomous vehicle to enter the intersection comprises:
in response to detecting the first pedestrian on the first sidewalk adjacent the first crosswalk prior to the second time,
determining a lack of right of way of the autonomous vehicle to enter the intersection based at least in part on presence of the first pedestrian on the first sidewalk adjacent the first crosswalk prior to the second time; and
in response to determining that the first pedestrian has entered the first crosswalk at the second time,
predicting possession of right of way of the autonomous vehicle to enter the intersection based at least in part on presence of the first pedestrian in the first crosswalk at the second time.

9. The method of claim 1, wherein detecting the first pedestrian proximate the intersection in the optical data comprises:
scanning the scene proximate the autonomous vehicle for pedestrians;
detecting the first pedestrian within the first sidewalk proximate the first crosswalk in optical data recorded via the optical sensor over a period of time preceding the second time; and
calculating an angular yaw offset between the first pedestrian and the first crosswalk;
wherein predicting the right of way of the autonomous vehicle to enter the intersection comprises:
predicting an intent of the first pedestrian to enter the first crosswalk as a function of a duration of the period of time and as an inverse function of the angular yaw offset; and
in response to predicting the intent of the first pedestrian to enter the first crosswalk,
determining that the intent of the first pedestrian to enter the first crosswalk exceeds a threshold intent; and
associating the right of way of the autonomous vehicle to enter the intersection with entry of the first pedestrian into the first crosswalk in response to determining that the intent of the first pedestrian to enter the first crosswalk exceeds the threshold intent.

10. The method of claim 1, wherein autonomously navigating along the first sidewalk comprises:
autonomously navigating toward a portion of the first sidewalk adjacent the first crosswalk at a first velocity, and
wherein autonomously navigating from the first sidewalk into the first crosswalk comprises:
autonomously navigating from the portion of the first sidewalk into the first crosswalk at a second velocity, wherein the second velocity is less than the first velocity.

11. The method of claim 1, wherein detecting the first pedestrian proximate the intersection in the optical data comprises:
detecting the first pedestrian in a second crosswalk at the intersection, wherein the second crosswalk intersects the navigation route, wherein predicting right of way of the autonomous vehicle to enter the intersection comprises:
calculating a confidence score for the right of way of the autonomous vehicle to enter the intersection based at least in part on presence of the first pedestrian in the second crosswalk that intersects the navigation route;
determining that the confidence score exceeds a threshold score; and
in response to determining that the confidence score exceeds the threshold score,
transmitting a query to a remote operator portal for confirmation to enter the intersection;
transmitting a portion of the optical data to the remote operator portal;
holding at the first sidewalk adjacent the first crosswalk; and
receiving the confirmation to enter the intersection from the remote operator portal in response to the query, and
wherein autonomously navigating from the first sidewalk into the first crosswalk comprises:
autonomously navigating from the first sidewalk into the first crosswalk in response to receiving confirmation to enter the intersection from the remote operator portal.

12. The method of claim 1, wherein detecting the first pedestrian proximate the intersection in the optical data comprises:
detecting the first pedestrian in a second crosswalk at the intersection, wherein the second crosswalk intersects the navigation route,
wherein predicting right of way of the autonomous vehicle to enter the intersection comprises:
calculating a confidence score for the right of way of the autonomous vehicle to enter the intersection based at least in part on presence of the first pedestrian in the second crosswalk that intersects the navigation route;
determining that the confidence score exceeds a threshold score;
in response to determining that the confidence score exceeds the threshold score,
transmitting a first query to a remote operator portal for confirmation to enter the intersection;
transmitting a portion of the optical data to the remote operator portal;
holding at the first sidewalk adjacent the first crosswalk; and
not receiving confirmation to enter the intersection from the remote operator portal in response to the first query, and
wherein autonomously navigating from the first sidewalk into the first crosswalk comprises:
in response to not receiving confirmation to enter the intersection from the remote operator portal in response to the first query:
remaining on the first sidewalk adjacent the first crosswalk;
recording optical data of the scene proximate the autonomous vehicle via the optical sensor at a third time, wherein the third time succeeds the second time;
calculating a revised confidence score for the right of way of the autonomous vehicle to enter the intersection based at least in part on the optical data recorded at the third time succeeding the second time;
determining that the revised confidence score exceeds a second threshold score; and in response to determining that the revised confidence score exceeds the second threshold score,
transmitting a second query to the remote operator portal for confirmation to enter the intersection; and
receiving the confirmation to enter the intersection from the remote operator portal in response to the second query,
wherein autonomously navigating from the first sidewalk into the first crosswalk comprises:
autonomously navigating from the first sidewalk into the first crosswalk in response to receiving the confirmation to enter the intersection from the remote operator portal in response to the second query.

13. The method of claim 11,
wherein recording optical data of the scene proximate the autonomous vehicle via the optical sensor comprises:
recording a color video feed of the scene proximate the autonomous vehicle via the optical sensor, wherein the optical sensor comprises a color camera integrated into the autonomous vehicle; and
wherein transmitting the portion of the optical data to the remote operator portal comprises:
querying a navigation map for a georeferenced area of interest associated with the intersection;
cropping frames in the color video feed around the georeferenced region of interest; and
transmitting the cropped frames in the color video feed to a remote computer system via wireless communication protocol for distribution to the remote operator portal.

14. A method for autonomously navigating along a crosswalk comprising, by an autonomous vehicle:
autonomously navigating along a first sidewalk toward the crosswalk at an intersection, wherein the crosswalk coincides with a navigation route assigned to the autonomous vehicle;
recording optical data of a scene proximate the autonomous vehicle via an optical sensor integrated into the autonomous vehicle;
aligning an anteroposterior axis of the autonomous vehicle to the crosswalk detected in the optical data;
at a first time, calculating a first confidence score for right of way of the autonomous vehicle to enter the crosswalk based at least in part on proximity of a vehicle detected proximate the intersection in the optical data;
at a second time succeeding the first time, detecting a pedestrian proximate the intersection in the optical data;
determining whether the first confidence score exceeds a first threshold score;
in response to determining that the first confidence score does not exceed the first threshold score,
determining that the pedestrian is entering the crosswalk;
calculating a second confidence score for the right of way of the autonomous vehicle to enter the crosswalk based at least in part on presence of the pedestrian in the crosswalk, wherein the second confidence score is greater than the first confidence score; and
determining whether the second confidence score exceeds a first threshold score; in response to determining that the second confidence score exceeds the first threshold score, transmitting a query to a remote operator portal for confirmation for the autonomous vehicle to enter the crosswalk;
receiving the confirmation for the autonomous vehicle to enter the crosswalk from the remote operator portal; and
in response to receiving the confirmation for the autonomous vehicle to enter the crosswalk from the remote operator portal, autonomously navigating from the first sidewalk into the crosswalk; and
autonomously navigating along the crosswalk to a second sidewalk according to the navigation route.

15. The method of claim 14, further comprising:
in response to determining that the first confidence score exceeds the first threshold score,
autonomously navigating from the first sidewalk into the crosswalk; and
autonomously navigating along the crosswalk to the second sidewalk according to the navigation route.

16. The method of claim 14, wherein recording the optical data of the scene comprises:
recording a color video feed of the scene proximate the autonomous vehicle via the optical sensor, wherein the optical sensor is a color camera integrated into the autonomous vehicle;
querying a navigation map for a georeferenced area of interest associated with the intersection;
cropping frames in the color video feed around the georeferenced region of interest; and
transmitting cropped frames in the color video feed to a remote computer system via wireless communication protocol for distribution to the remote operator portal.

17. The method of claim 14, wherein the second confidence score is at least one of:
proportional to a size and a density of a group of pedestrians detected in the crosswalk at approximately the second time;
inversely proportional to a detected speed of the group of pedestrians moving across the crosswalk at approximately the second time;
inversely proportional to a number of pedestrians moving across a second crosswalk perpendicular to the crosswalk at approximately the second time; and
inversely proportional to speeds of vehicles approaching the intersection perpendicular to the crosswalk at approximately the second time.

18. The method of claim 14, wherein detecting the pedestrian proximate the intersection in the optical data comprises:
detecting the pedestrian within the first sidewalk proximate the crosswalk; and
wherein autonomously navigating along the crosswalk to the second sidewalk comprises:
autonomously navigating from the first sidewalk into the crosswalk via a near ramp at the intersection, wherein the near ramp extends between at least a portion of the first sidewalk and at least a first portion of the crosswalk;
autonomously navigating within the crosswalk to a far ramp, wherein the far ramp extends between at least a second portion of the crosswalk and at least a portion of the second sidewalk, and wherein autonomously navigating within the crosswalk to the far ramp comprises autonomously maintaining at least a threshold distance between the autonomous vehicle and the pedestrian as the autonomous vehicle navigates within the crosswalk; and
autonomously navigating from the crosswalk to the second sidewalk via the far ramp.

19. A method for autonomously navigating along a crosswalk at an intersection by an autonomous vehicle, wherein the method comprises:
autonomously navigating along a first sidewalk toward a crosswalk at the intersection, wherein the crosswalk coincides with a navigation route assigned to the autonomous vehicle;
recording optical data of a scene proximate the autonomous vehicle via an optical sensor integrated into the autonomous vehicle;
detecting the crosswalk in the optical data;
aligning an anteroposterior axis of the autonomous vehicle to the crosswalk detected in the optical data;
at a first time, determining states of lighted traffic signals, proximate the intersection based at least in part on the optical data;
at approximately the first time, calculating a velocity of a vehicle approaching the intersection;
calculating a confidence score for right of way of the autonomous vehicle to enter the intersection based at least in part on the states of the lighted traffic signals proximate the intersection and the velocity of the vehicle;
determining that the confidence score exceeds a threshold score;
in response to determining that the confidence score exceeds the threshold score, transmitting a query to a remote operator portal to confirm entry of the autonomous vehicle into the crosswalk;
receiving confirmation of the entry of the autonomous vehicle into the crosswalk from the remote operator portal in response to the query; and
in response to receiving the confirmation from the remote operator portal:
autonomously navigating from the first sidewalk into the crosswalk; and
autonomously navigating along the crosswalk to a second sidewalk according to the navigation route.

20. The method of claim 19, further comprising:
detecting a pedestrian proximate the intersection at approximately the first time based at least in part on the optical data;
determining that the pedestrian entered the crosswalk at a second time based at least in part on the optical data, wherein the second time follows the first time; and
in response to determining that the pedestrian entered the crosswalk at the second time,
increasing the confidence score for the right of way of the autonomous vehicle to enter the intersection.

* * * * *